United States Patent
Kawamae et al.

(10) Patent No.: US 10,652,595 B2
(45) Date of Patent: May 12, 2020

(54) CONTENT TRANSMISSION DEVICE AND CONTENT TRANSMISSION METHOD THEREOF

(71) Applicant: Maxell, Ltd., Kyoto (JP)

(72) Inventors: Osamu Kawamae, Oyamazaki (JP); Hiroshi Chiba, Oyamazaki (JP); Chiyo Ohno, Tokyo (JP)

(73) Assignee: MAXELL, LTD., Kyoto (JP)

( * ) Notice: Subject to any disclaimer, the term of this patent is extended or adjusted under 35 U.S.C. 154(b) by 142 days.

(21) Appl. No.: 16/011,668

(22) Filed: Jun. 19, 2018

(65) Prior Publication Data
US 2018/0310035 A1  Oct. 25, 2018

Related U.S. Application Data

(63) Continuation of application No. PCT/JP2016/053685, filed on Feb. 8, 2016.

(51) Int. Cl.
*H04L 29/06* (2006.01)
*H04N 21/2347* (2011.01)
(Continued)

(52) U.S. Cl.
CPC ......... *H04N 21/2347* (2013.01); *H04L 51/08* (2013.01); *H04L 51/10* (2013.01);
(Continued)

(58) Field of Classification Search
CPC ............. H04L 63/0428; H04W 12/009; H04N 21/2662
See application file for complete search history.

(56) References Cited

U.S. PATENT DOCUMENTS 10,068,101 B2 * 9/2018 Durham ................. H04L 63/20
2001/0043744 A1 * 11/2001 Hieda ............ H04N 21/234327
382/232
(Continued)

FOREIGN PATENT DOCUMENTS

JP   2007-174249 A   7/2007
JP   2012-43464 A    3/2012
(Continued)

*Primary Examiner* — Ponnoreay Pich
(74) *Attorney, Agent, or Firm* — Mattingly & Malur, PC

(57) ABSTRACT

A content transmission device has a first encryption process means that encrypts, by a digital communication interface, a digital content for transmission to a content reception device and encrypts a low-resolution content by a first encryption process; a second encryption process that encrypts a high-resolution content by a second encryption process; and a down-conversion means that down-converts the high-resolution content to the low-resolution content. The content transmission device receives, from a digital reception device, information related to an encryption process of the digital reception device. Then, if the digital reception device supports the second encryption process, the content transmission device transmits the high-resolution content as encrypted by the second encryption process. If the digital reception device does not support the second encryption process, the content transmission device down-converts the high-resolution content and encrypts, by the first encryption process, the down-converted content for transmission.

10 Claims, 21 Drawing Sheets

(51) Int. Cl.
*H04N 21/266* (2011.01)
*H04L 12/58* (2006.01)
*H04N 19/40* (2014.01)
*H04N 19/46* (2014.01)
*H04N 19/70* (2014.01)
*H04N 7/167* (2011.01)
*H04N 5/232* (2006.01)

(52) U.S. Cl.
CPC .......... *H04L 63/0428* (2013.01); *H04L 69/08* (2013.01); *H04N 7/1675* (2013.01); *H04N 19/40* (2014.11); *H04N 19/46* (2014.11); *H04N 19/70* (2014.11); *H04N 21/266* (2013.01); *H04N 5/23245* (2013.01)

(56) References Cited

U.S. PATENT DOCUMENTS

| | | | |
|---|---|---|---|
| 2003/0226009 A1* | 12/2003 | Maeda | H04L 63/0428 713/150 |
| 2004/0028227 A1* | 2/2004 | Yu | H04L 63/0428 380/201 |
| 2007/0140490 A1 | 6/2007 | Tanabe et al. | |
| 2014/0106815 A1 | 4/2014 | Sako et al. | |
| 2014/0211941 A1* | 7/2014 | Oh | G06F 21/10 380/201 |
| 2018/0310035 A1* | 10/2018 | Kawamae | H04N 19/46 |

FOREIGN PATENT DOCUMENTS

| | | |
|---|---|---|
| JP | 2014-082667 A | 5/2014 |
| JP | 2014-147065 A | 8/2014 |

\* cited by examiner

F I G. 5
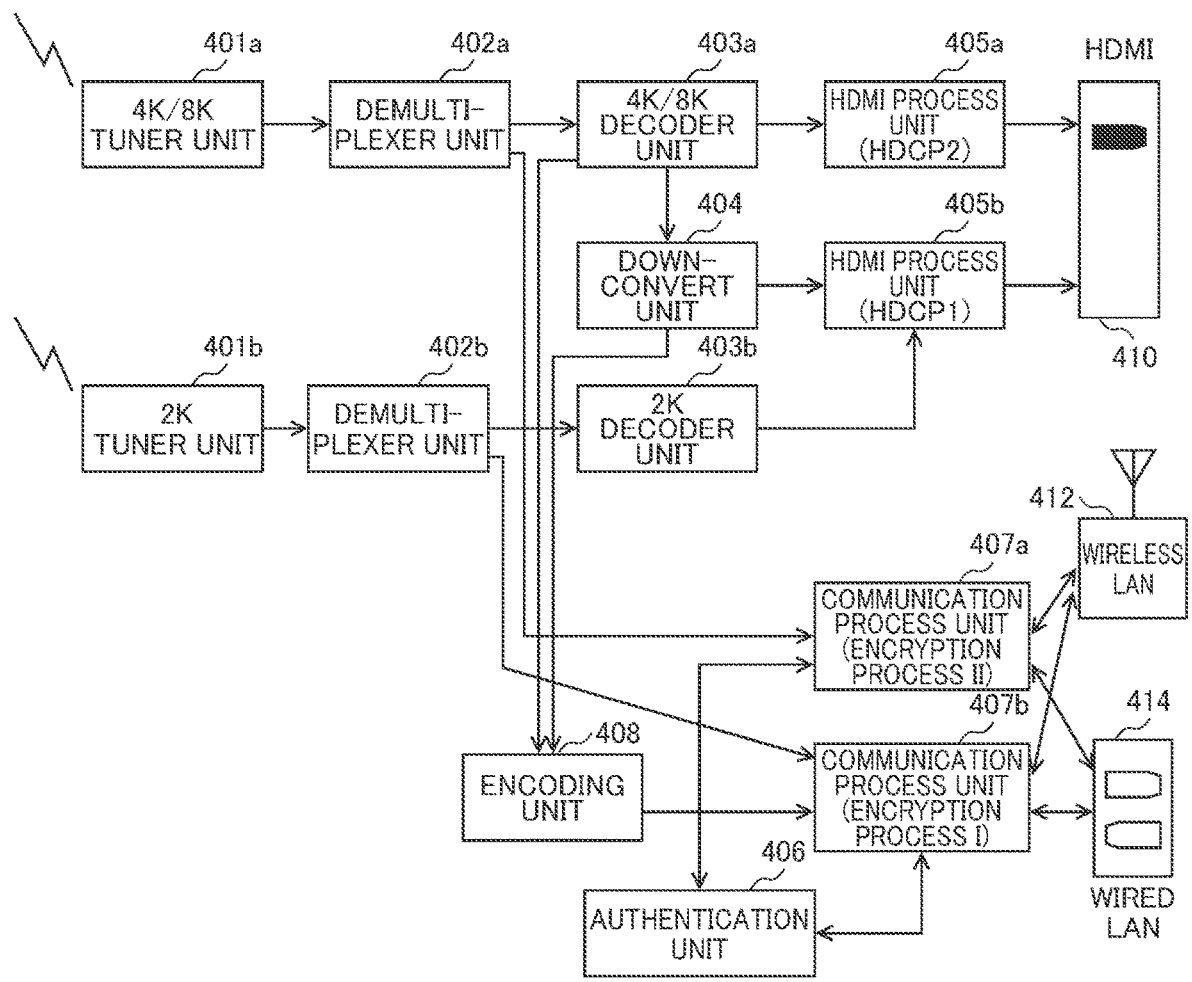

FIG. 7A(a)
CONTENT TRANSMISSION PACKET 800
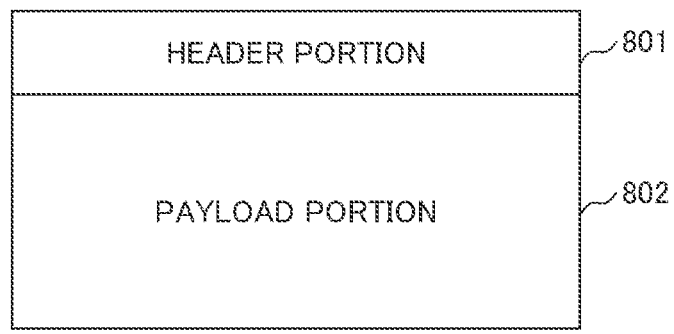
FIG. 7A(b)    HEADER PORTION 801
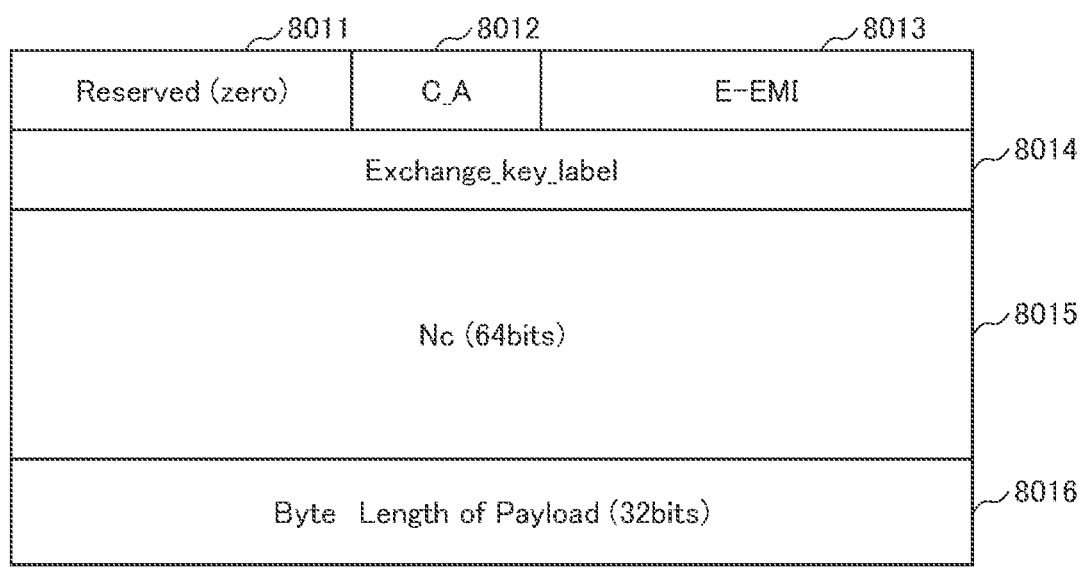

FIG. 8A

DEVICE INFORMATION DEFINITION TABLE 5100

| AUTHENTICATION DEVICE MAXIMUM NUMBER | 34 | 5101 |
|---|---|---|
| COUNTER MAXIMUM VALUE | 120 | 5102 |
| SIMULTANEOUS ACCESS MAXIMUM NUMBER | 7 | 5103 |
| SIMULTANEOUS ACCESS MAXIMUM NUMBER (4K/8K) | 3 | 5104 |

FIG. 8B

DEVICE CONTROL INFORMATION TABLE 5200

| EXCHANGE KEY | #$&%"! | 5220 |
|---|---|---|
| NUMBER OF AUTHENTICATION DEVICES | 3 | 5221 |
| NUMBER OF SIMULTANEOUS ACCESSES | 2 | 5222 |
| NUMBER OF SIMULTANEOUS ACCESSES (4K/8K) | 1 | 5223 |

FIG. 8C

DEVICE INFORMATION TABLE 5300

| ID | DEVICE ID | ADDRESS INFORMATION | COUNTER VALUE | STATUS |
|---|---|---|---|---|
| 1 | TV0032AA | AAAAA | 75 | DURING ACCESS |
| 2 | NTPC0098001 | BBBBB | 120 | STOP |
| 3 | TV2020XT003 | CCCCC | 40 | DURING ACCESS |
| ... | ... | ... | ... | ... |

| MANUFACTURER NAME | FORMAT | DEVICE TYPE |
|---|---|---|
| COMPANY A | TV01 | TV |
| COMPANY S | NTPC0098 | PC |
| COMPANY B | TV2020XT | TV |
| ... | ... | ... |

HDMI INFORMATION

| RESOLUTION | HDR | HDCP VERSION | NUMBER OF INPUT TERMINALS | NUMBER OF OUTPUT TERMINALS |
|---|---|---|---|---|
| 7680 × 4320 | ○ | X.X | 4 | 4 |
| 3840 × 2160, 1980 × 1080 | ○ | 2.2 | 2 | 2 |
| 1980 × 1080, 1440 × 1080, 1280 × 720, 720 × 480 | × | 1.4 | 1 | 1 |
| ... | ... | ... | ... | ... |

NETWORK INFORMATION

| ENCRYPTION STANDARD VERSION | NUMBER OF TERMINALS | WIRELESS | VELOCITY |
|---|---|---|---|
| ENCRYPTION PROCESS I AND ENCRYPTION PROCESS II | 2 | – | 100M/1G |
| ENCRYPTION PROCESS II | 1 | IEEE 802.11 a/b/g | 100M/1G |
| ENCRYPTION PROCESS I | 1 | – | 100M |
| ... | ... | ... | ... |

F I G. 9 A

CONTENT AVAILABILITY DESCRIPTOR 1200

| | NAME | CONTENT |
|---|---|---|
| 1201 | COPY CONSTRAINT MODE (copy_restriction_mode) | INDICATE MODE OF COPY NUMBER CONSTRAINT. SET ACCORDING TO OPERATION RULE OF CONTENT PROVIDER. <br> 1: COPY NUMBER CONSTRAINT IS OPERATED (DEFAULT) <br> 0: COPY NUMBER CONSTRAINT IS NOT OPERATED |
| 1202 | RESOLUTION CONSTRAINT BIT (image_constraint_token) | INDICATE RESOLUTION CONSTRAINT OF PROJECTED IMAGE SIGNAL OUTPUT <br> 1: RESOLUTION IS NOT CONSTRAINED (DEFAULT) <br> 0: RESOLUTION IS CONSTRAINED |
| 1203 | TEMPORARY ACCUMULATION CONTROL BIT (retention_mode) | INDICATE WHETHER OR NOT TEMPORARY ACCUMULATION IS ADMITTED <br> 1: TEMPORARY ACCUMULATION IS NOT CAPABLE OF BEING PERFORMED <br> 0: TEMPORARY ACCUMULATION IS CAPABLE OF BEING PERFORMED (DEFAULT) |
| 1204 | TEMPORARY ACCUMULATION ADMISSION TIME (retention_state) | INDICATE TEMPORARY ACCUMULATION ADMISSION TIME <br> 1 HOUR AND 30 MINUTES (DEFAULT), 3 HOURS, ..., NO CONSTRAINT |
| 1205 | OUTPUT PROTECTION BIT (encryption_mode) | INDICATE PRESENCE OR ABSENCE OF OUTPUT PROTECTION WHEN CONTENT OF "COPIABLE WITHOUT ANY CONSTRAINT CONDITION" IS OUTPUT FROM DIGITAL INTERFACE <br> 1: OUTPUT PROTECTION ABSENT (DEFAULT) <br> 0: OUTPUT PROTECTION PRESENT |
| 1206 | REMOTE ACCESS CONSTRAINT MODE (remote_access_restriction_mode) | INDICATE MODE OF REMOTE ACCESS CONSTRAINT. SET ACCORDING TO OPERATION RULE OF CONTENT PROVIDER. <br> 1: REMOTE ACCESS IS NOT CONSTRAINED (DEFAULT) <br> 0: REMOTE ACCESS IS CONSTRAINED |
| 1207 | DOWN-CONVERT CONSTRAINT MODE (downconvert_restriction_mode) | INDICATE WHETHER OR NOT DOWN-CONVERT IS ADMITTED WHEN PROJECTED IMAGE IS OUTPUT <br> 1: DOWN-CONVERT IS NOT CAPABLE OF BEING PERFORMED <br> 0: DOWN-CONVERT IS CAPABLE OF BEING PERFORMED |

FIG. 9B

DIGITAL COPY CONTROL DESCRIPTOR 1300

| NAME | CONTENT |
|---|---|
| 1301 DIGITAL COPY CONTROL INFORMATION (digital_recording_control_data) | INDICATE INFORMATION CONTROLLING COPY GENERATION<br>00: COPIABLE WITHOUT ANY CONSTRAINT CONDITION<br>01: UNUSED (OR COPY NEVER)<br>10: COPIABLE ONLY IN SINGLE GENERATION<br>11: COPY NEVER |
| 1302 COPY CONTROL FORMAT INFORMATION (copy_control_type) | INDICATE INFORMATION OF FORMAT CONTROLLING COPY GENERATION<br>01: ENCRYPTION PROTECTION IS PERFORMED WITH RESPECT TO OUTPUT FROM DIGITAL INPUT AND OUTPUT TERMINAL<br>11: ENCRYPTION PROTECTION IS NOT PERFORMED WITH RESPECT TO OUTPUT FROM DIGITAL INPUT AND OUTPUT TERMINAL |
| 1303 ANALOG OUTPUT COPY CONTROL INFORMATION (APS_control_data) | INDICATE INFORMATION CONTROLLING COPY OF ANALOG OUTPUT IN CASE WHERE COPY CONTROL FORMAT INFORMATION IS "01" OR "11"<br>00: COPIABLE WITHOUT ANY CONSTRAINT CONDITION<br>OTHER THAN 00: CONSTRAINT CONDITION PRESENT |

FIG. 9C

DOWN-CONVERT CONSTRAINT DESCRIPTOR 1400

| NAME | CONTENT |
|---|---|
| 1401 DOWN-CONVERT TARGET CONTENT (downconvert_target_content) | RESOLUTION OF 1920 × 1080 + HDR<br>RESOLUTION OF GREATER THAN OR EQUAL TO 3840 × 2160 |
| 1402 DOWN-CONVERT CONSTRAINT DATE AND TIME (downconvert_restriction_date) | DOWN-CONVERT IS NOT ADMITTED UNTIL 2018/3/31<br>DOWN-CONVERT IS ADMITTED AFTER 2018/4/1 |
| 1403 SIMUL BROADCASTING PROGRAM INFORMATION (simul_program_information) | DISTRIBUTED AT SAME TIME BY 2K TUNER<br>URL: http://www.aaa.co.jp/ABC |
| 1404 DOWN-CONVERT CONDITION (downconvert_condition) | DOWN-CONVERT OF HDR IS ADMITTED ONLY IN HLG METHOD<br>CONVERT WITH RESPECT TO RESOLUTION SD IS NOT ADMITTED |

FIG. 10

OUTPUT CONTROL RULES BY DIGITAL COPY CONTROL DESCRIPTOR AND CONTENT AVAILABILITY DESCRIPTOR 1500

| DIGITAL COPY CONTROL DESCRIPTOR | | CONTENT AVAILABILITY DESCRIPTOR | | OUTPUT OPERATION (AVAILABILITY OF OUTPUT OF DIGITAL CONTENT FROM D DIGITAL INPUT AND OUTPUT TERMINAL, PRESENCE OR ABSENCE OF ENCRYPTION, AND ENCRYPTION MODE (E-EMI)) 1505 |
|---|---|---|---|---|
| COPY CONTROL FORMAT INFORMATION (copy_control_type) 1501 | DIGITAL COPY CONTROL INFORMATION (digital_recording_control_data) 1502 | OUTPUT PROTECTION BIT (encryption_mode) 1503 | DOWN-CONVERT CONSTRAINT MODE (downconvert_restriction_mode) 1504 | |
| 01 | 00 | 1 | —*2 | AVAILABLE IN OUTPUT, ENCRYPTION ABSENT |
|    | 00 | 0 | —*2 | AVAILABLE IN OUTPUT, ENCRYPTION PRESENT, Copy free with EPN |
|    | 01*1 | —*2 | 1 | AVAILABLE IN OUTPUT, ENCRYPTION PRESENT, No more copies, UNAVAILABLE IN DOWN-CONVERT |
|    | 01*1 | —*2 | 0 | AVAILABLE IN OUTPUT, ENCRYPTION PRESENT, No more copies, AVAILABLE IN DOWN-CONVERT*3 |
|    | 10 | —*2 | 1 | AVAILABLE IN OUTPUT, ENCRYPTION PRESENT, Copy one generation, UNAVAILABLE IN DOWN-CONVERT |
|    | 10 | —*2 | 0 | AVAILABLE IN OUTPUT, ENCRYPTION PRESENT, Copy one generation, AVAILABLE IN DOWN-CONVERT*3 |
|    | 11 | —*2 | 1 | AVAILABLE IN OUTPUT, ENCRYPTION PRESENT, Copy never, UNAVAILABLE IN DOWN-CONVERT OUTPUT |
|    | 11 | —*2 | 0 | AVAILABLE IN OUTPUT, ENCRYPTION PRESENT, Copy never, AVAILABLE IN DOWN-CONVERT*3 |
| 11 | 00 | —*2 | —*2 | AVAILABLE IN OUTPUT, ENCRYPTION ABSENT |
|    | 01*1 | —*2 | —*2 | UNAVAILABLE IN OUTPUT |
|    | 10 | —*2 | —*2 | UNAVAILABLE IN OUTPUT |
|    | 11 | —*2 | —*2 | UNAVAILABLE IN OUTPUT |
| OTHER THAN 01/11*1 | —*2 | | | UNAVAILABLE IN OUTPUT |

*1 COMBINATION NOT OPERATED IN GENERAL.
*2 MEANING OF DON'T CARE
*3 NEED TO CONFIRM CONDITION BY DOWN-CONVERT CONSTRAINT DESCRIPTOR

FIG. 11

DIGITAL CONTENT RECORDING CONTROL TABLE 1600

| DIGITAL COPY CONTROL DESCRIPTOR | CONTENT AVAILABILITY DESCRIPTOR | | RECORDING CONTROL OF DIGITAL CONTENT INPUT FROM DIGITAL INPUT AND OUTPUT TERMINAL ~1605 | DIGITAL PROJECTED IMAGE/SOUND OUTPUT OF DIGITAL CONTENT INPUT FROM DIGITAL INPUT AND OUTPUT TERMINAL ~1606 |
|---|---|---|---|---|
| COPY CONTROL FORMAT INFORMATION (copy_control_type) ~1601 / DIGITAL COPY CONTROL INFORMATION (digital_recording_control_data) ~1602 | OUTPUT PROTECTION BIT (encryption_mode) ~1603 | DOWN-CONVERT CONSTRAINT MODE (downconvert_restriction_mode) ~1604 | | |
| 00 / 00 | 1 | — | COPIABLE | AVAILABLE IN OUTPUT |
| 00 / 00 | 0 | — | COPIABLE (PERFORM RECORDING BY ENCRYPTION) | AVAILABLE IN OUTPUT |
| 01 / 01 | — | 1 | COPY NEVER | AVAILABLE IN OUTPUT, ENCRYPTION PRESENT, UNAVAILABLE IN DOWN-CONVERT |
| 01 / 01 | — | 0 | COPY NEVER | AVAILABLE IN OUTPUT, ENCRYPTION PRESENT, AVAILABLE IN DOWN-CONVERT |
| 01 / 10 | — | 1 | COPIABLE ONLY IN SINGLE GENERATION (PERFORM RECORDING BY ENCRYPTION, PERFORM RECORDING BY REWRITING DIGITAL COPY CONTROL INFORMATION TO 01) | AVAILABLE IN OUTPUT, ENCRYPTION PRESENT, UNAVAILABLE IN DOWN-CONVERT |
| 01 / 10 | — | 0 | COPIABLE ONLY IN SINGLE GENERATION (PERFORM RECORDING BY ENCRYPTION, PERFORM RECORDING BY REWRITING DIGITAL COPY CONTROL INFORMATION TO 01) | AVAILABLE IN OUTPUT, ENCRYPTION PRESENT, AVAILABLE IN DOWN-CONVERT |
| 01 / 11 | — | 1 | COPY NEVER | AVAILABLE IN OUTPUT, ENCRYPTION PRESENT, UNAVAILABLE IN DOWN-CONVERT |
| 01 / 11 | — | 0 | COPY NEVER | AVAILABLE IN OUTPUT, ENCRYPTION PRESENT, AVAILABLE IN DOWN-CONVERT |
| 11 / 00 | — | — | COPIABLE | AVAILABLE IN OUTPUT |
| 11 / OTHER THAN 00 | — | 1 | COPY NEVER | AVAILABLE IN OUTPUT, ENCRYPTION PRESENT, UNAVAILABLE IN DOWN-CONVERT |
| 11 / OTHER THAN 00 | — | 0 | COPY NEVER | AVAILABLE IN OUTPUT, ENCRYPTION PRESENT, AVAILABLE IN DOWN-CONVERT |
| OTHER THAN 01/11 | — | — | COPY NEVER | UNAVAILABLE IN OUTPUT |

—: MEANING OF DON'T CARE

CONTENT TRANSMISSION DEVICE AND CONTENT TRANSMISSION METHOD THEREOF

TECHNICAL FIELD

The present invention relates to a content transmission device, and a content transmission method thereof, and in particular, relates to a content transmission device, and a content transmission method thereof, which are preferable for securely transmitting a content according to a function of content reception side.

BACKGROUND ART

Recently, a digital content has been easily enjoyable on a home network which is built out in the home, according to development in an electronic technology and a communication technology. The digital content is capable of providing a beautiful image with a high definition, with respect to a user, and is capable of providing various associated information services. On the other hand, an image quality of the digital content is not degraded in the case of being copied by a digital process, unlike copy of analog data. For this reason, it is a problem that copyright protection is performed in order to prevent illegal copy.

Thus, there is digital transmission content protection (DTCP), as a standard set to prevent the illegal copy, from the viewpoint of the copyright protection. The DTCP is a copyright protection method which is used for preventing copy of a sound or an image in a home network/a personal network, and is mainly used together with a digital living network alliance (DLNA) which is an interconnection guideline for sharing image or sound data between digital devices. In the DTCP, a common key encryption method is used in which common keys are exchanged between the digital devices, and thus, encryption is performed. A technology of transmitting and receiving the digital data between the digital devices, by the common key, for example, is disclosed in Patent Document 1.

On the other hand, a cooperation function between a smart phone and a home electrical appliance, such as controlling the home electrical appliance by the smart phone, or distributing the digital content, has attracted attention, according to high functionality of the smart phone. As a technology relevant to the content transmission, a technology is disclosed in Patent Document 2, in which a user selects an external output device (a TV or the like) by a smart phone (a mobile phone unit), and process ability of the selected external output device and identification information of identifying the output device are specified. Then, a request is performed with respect to a home server such that a content suitable for the process ability of the external output device is transmitted to the external output device, and thus, the content transmitted from the home server is received by the external output device, and is output as an image.

CITATION LIST

Patent Document

Patent Document 1: JP 2007-174249 A
Patent Document 2: JP 2012-43464 A

SUMMARY OF THE INVENTION

Problems to be Solved by the Invention

According to development in a digital technology, a standard (4K/8K) is designed in which a resolution of a projected image or a moving image (the number of pixels) is high, and 4K broadcast is partially started, compared to current HD television broadcast. In a current full HD (2K) standard, the number of pixels is 1920×1080 (1080i, 1080p), but in a 4K UHD standard, the number of pixels is 3840× 2160 (2160p), and in a 8K UHD standard, the number of pixels is 7680×4320 (4320p). In addition, there is a ultra HD Blu-ray (UHD BD; Registered Trademark), as a next-generation standard of an optical disk relationship, and the number of pixels is defined as 3840×2160 (2160p).

According to such high-image quality of a projected image content, while performing the copyright protection, it is important for an arbitrary monitor device to build out a mechanism of displaying and viewing. In addition, there are a plurality of digital devices including a monitor even in the standard home according to low-pricing or spread of a personal computer (PC), a tablet, and a smart phone, a content of the full HD (2K) standard of the related art (hereinafter, referred to as "2K content" or the like) and a content of a 4K/8K standard of a new standard, are mixed together, and thus, how to display the mixed contents on the plurality of digital devices is a problem.

There is a demand for a content providing source to perform viewing/copy constraint by discriminating a high-image quality 4K/8K content from the content of the related art in order for a premium service or the like. On the other hand, it is necessary for a device (a content transmission device) receiving a 4K/8K content of a copyright protection target through the broadcast or the Internet, to safely transmit the content to the other device (a content reception device), according to the intention of the content providing source.

Further, in a case where there are a plurality of devices displaying the received content in the home or in the office, there is a request for the content transmission device to simply view the 4K/8K content in a desired device.

In Patent Document 1 of the technology of the related art described above, a transmission method is described in which the content of the copyright protection target is encrypted by the DTCP, but a transmission technology for discriminating a plurality of contents having different qualities, such as the 4K/8K content, to manage the contents, is not considered. In addition, in Patent Document 2, it is possible to select an external output device according to process ability of an output destination, but an encryption process is not considered.

The present invention has been made in order to solve the problems described above, and an object thereof is to provide a content transmission device such as a smart phone, in which in an environment where digital devices displaying a plurality of contents having different qualities are mixed together, it is possible to securely transmit the content according to a function of a content reception side, and to display a high-image quality content of a new standard to a reception device which is capable of only displaying a content of a quality of the related art.

Solutions to Problems

In order to attain the object described above, a configuration of a content transmission device of the present invention is a content transmission device transmitting a digital content to a content reception device, and includes: a means encrypting the digital content by a digital communication interface (I/F) to be transmitted; a first encryption process means encrypting a low-resolution content by a first encryption process; a second encryption process means encrypting a high-resolution content by a second encryption process; and a down-conversion means down-converting the high-resolution content into the low-resolution content. Then, information relevant to the encryption process of a digital reception device is received from the digital reception device, when the digital reception device supports the second encryption process, the high-resolution content is encrypted by the second encryption process means to be transmitted, when the digital reception device does not support the second encryption process, the high-resolution content is down-converted, and the down-converted content is encrypted by the first encryption process to be transmitted.

Effects of the Invention

According to the present invention, is possible to provide a content transmission device such as a smart phone, in which in an environment where digital devices displaying a plurality of contents having different qualities are mixed together, it is possible to securely transmit the content according to a function of a content reception side, and to display a high-image quality content of a new standard to a reception device which is capable of only displaying a content of a quality of the related art.

BRIEF DESCRIPTION OF THE DRAWINGS

FIG. 5 is a data flow diagram in the content transmission device.

FIGS. 7A(a) and 7A(b) are diagrams illustrating an example of a content transmission packet of encryption process I support.

FIG. 8A is a diagram illustrating an example of a device information definition table.

FIG. 8B is a diagram illustrating an example of a device control information table.

FIG. 8C is a diagram illustrating an example of a device information table.

FIG. 9A is a diagram illustrating an example of a content availability descriptor.

FIG. 9B is a diagram illustrating an example of a digital copy control descriptor.

FIG. 9C is a diagram illustrating an example of a down-convert constraint descriptor.

FIG. 10 is a diagram illustrating an example of output control rules by the digital copy control descriptor and content availability descriptor.

FIG. 11 is a diagram illustrating an example of a digital content recording control table.

MODE FOR CARRYING OUT THE INVENTION

Hereinafter, one embodiment according to the present invention will be described by using FIG. 1 to FIG. 16.

First, configurations of a home network according to one embodiment, and a component relevant thereto will be described by using FIG. 1 to FIG. 5.

Figure 1:
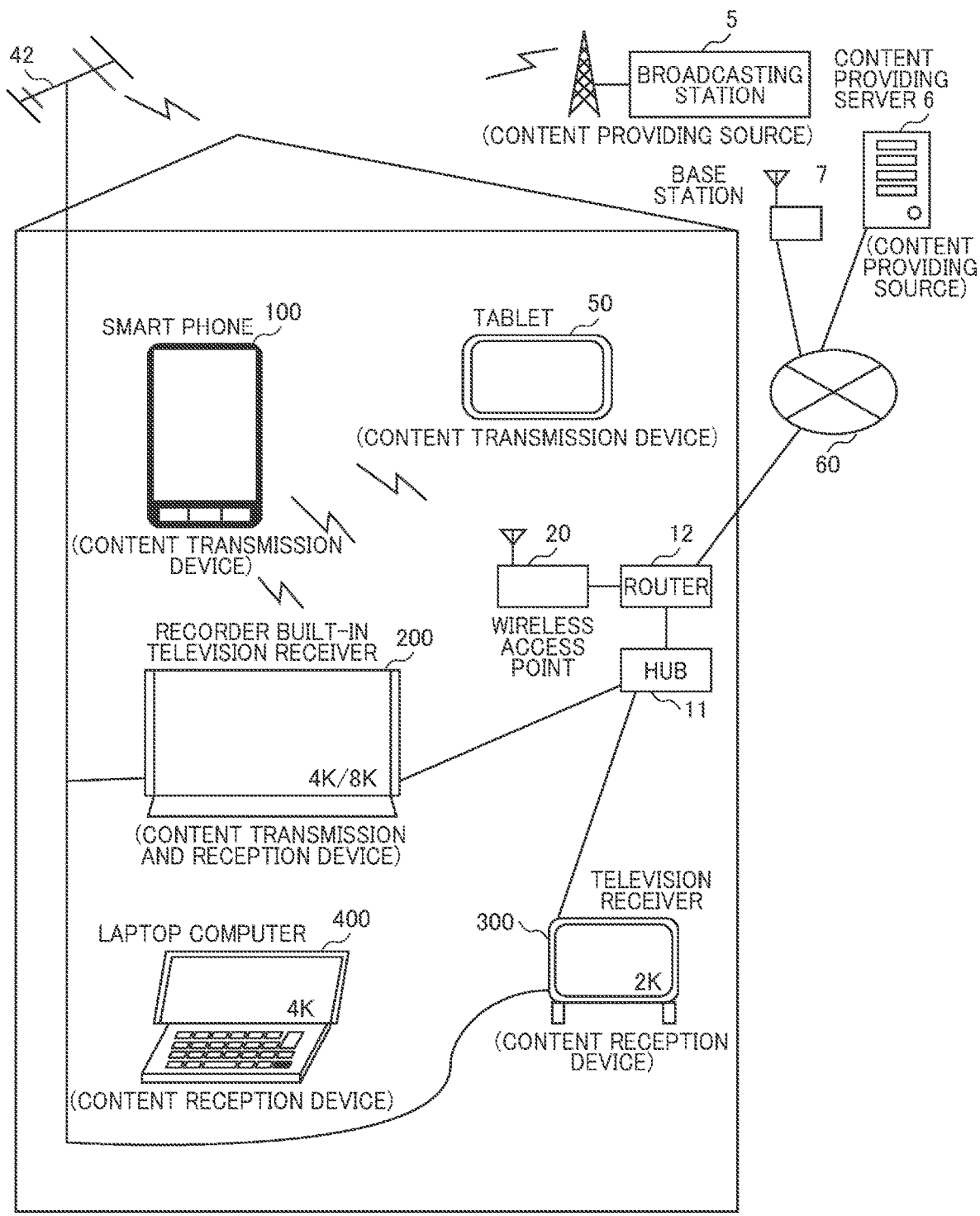
FIG. 1 is an outline diagram of a home network and a component relevant thereto.

FIG. 1 is an outline diagram of the home network, and the component relevant thereto.

Figure 2:
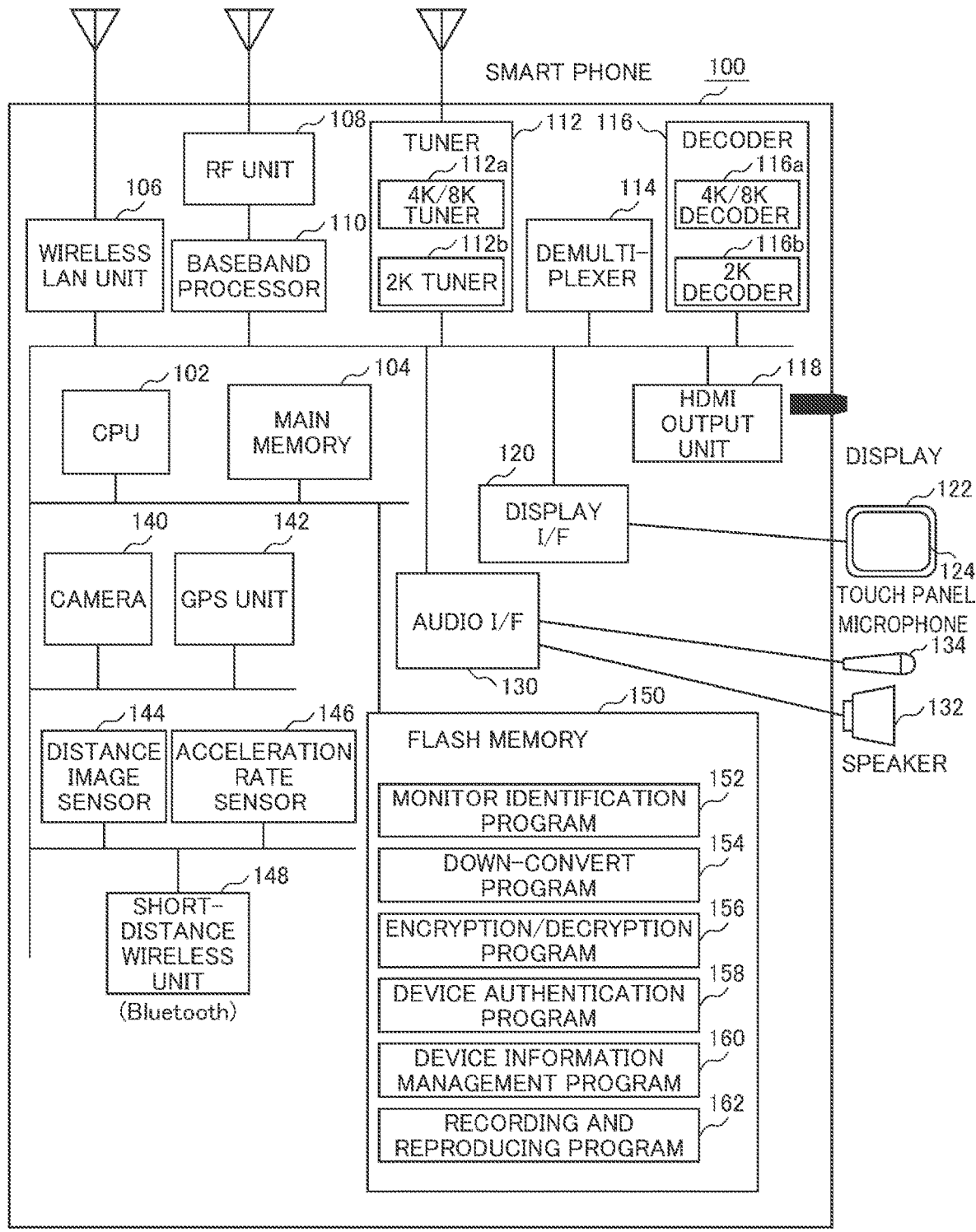
FIG. 2 is a configuration diagram of a smart phone (a content transmission device).

FIG. 2 is a configuration diagram of a smart phone (a content transmission device).

Figure 3:
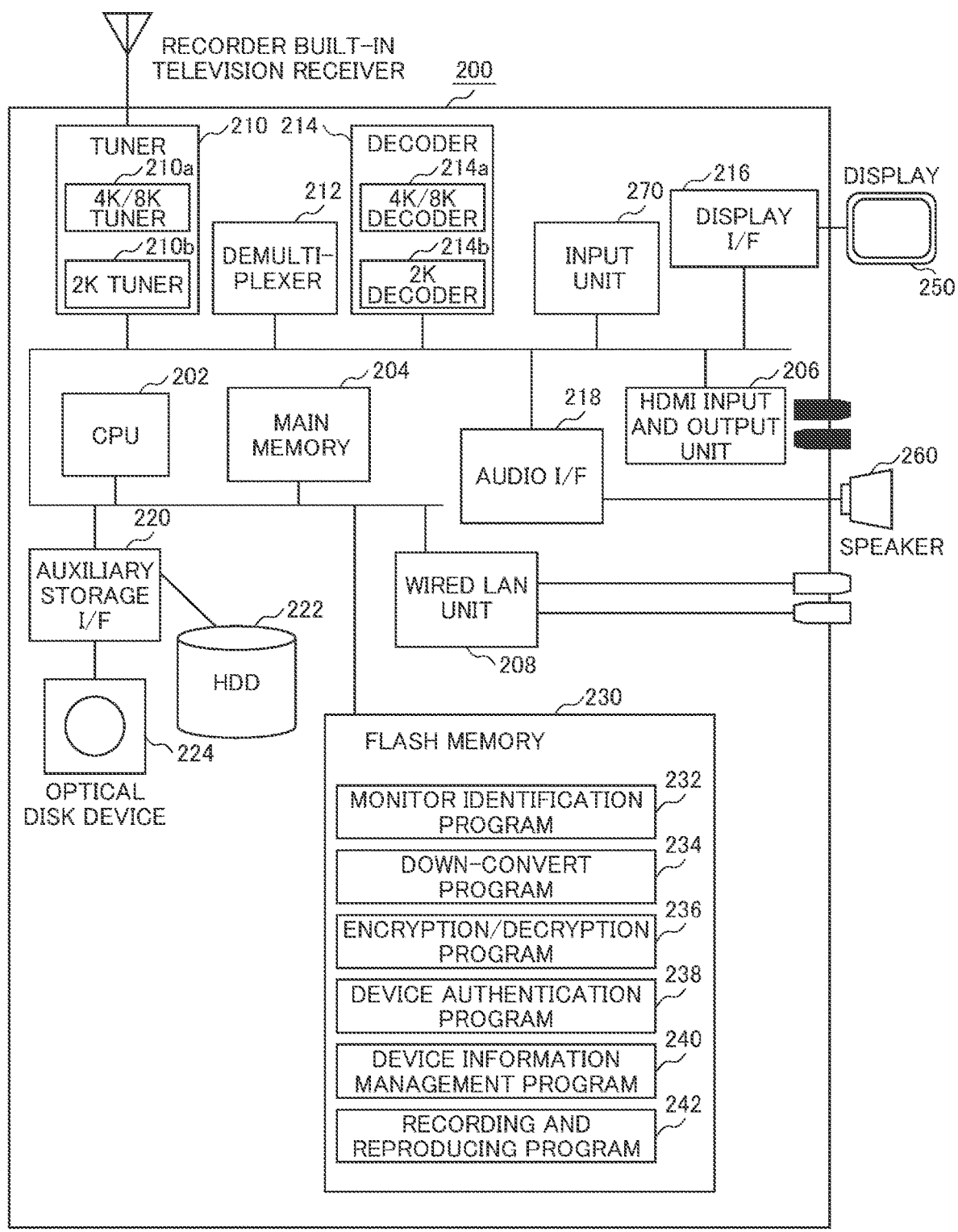
FIG. 3 is a configuration diagram of a recorder built-in television receiver (a content transmission and reception device).

FIG. 3 is a configuration diagram of a recorder built-in television receiver (the content transmission and reception device).

Figure 4:
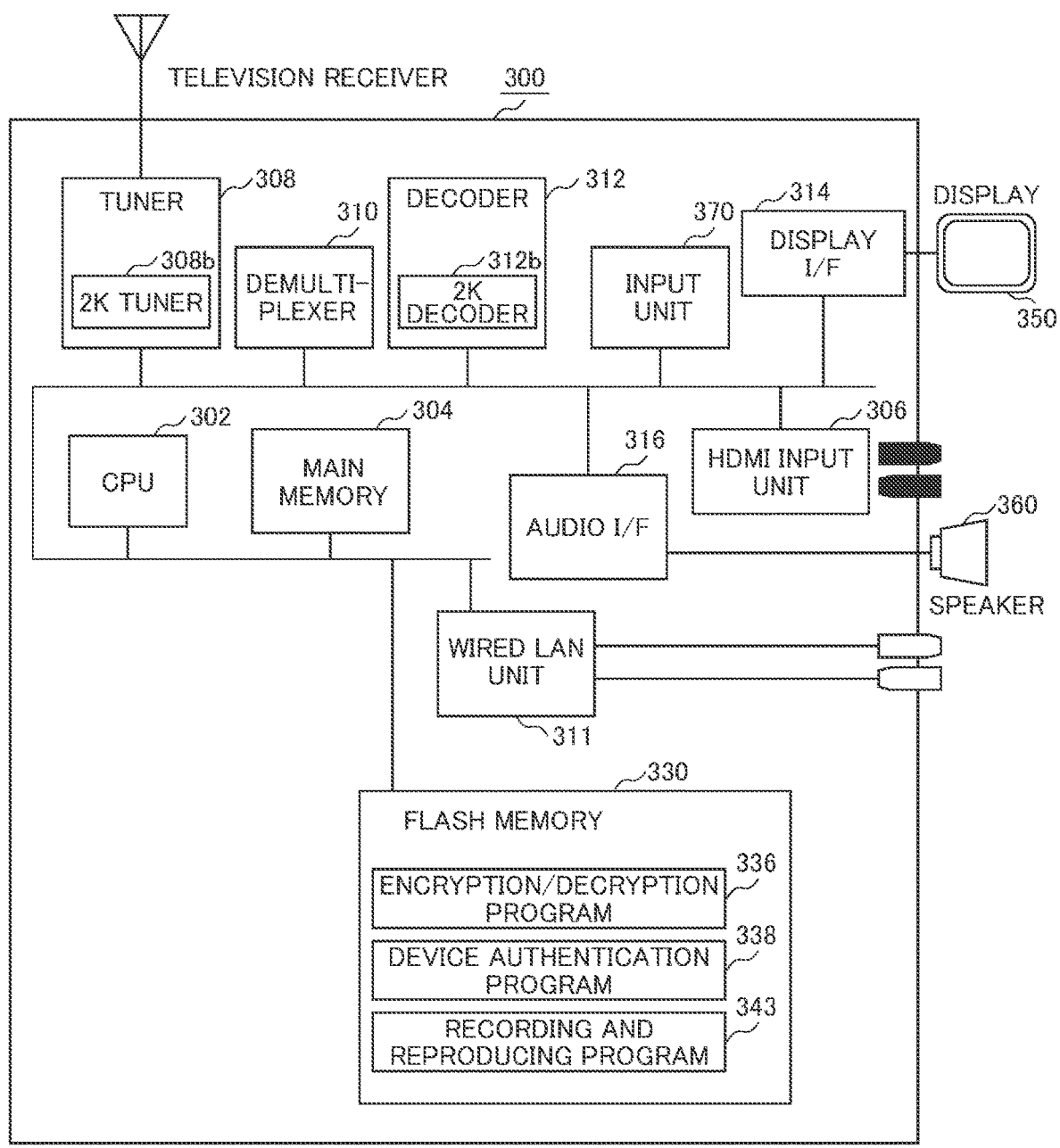
FIG. 4 is a configuration diagram of a television receiver (a content reception device).

FIG. 4 is a configuration diagram of a television receiver (a content reception device).

FIG. 5 is a data flow diagram in the content transmission device.

In this embodiment, a content transmission method will be described in which the content transmission device receives a 4K/8K content, and the 4K/8K content is down-converted, with the resolution as it is or according to a function of the content reception device, and is transmitted to the content transmission device.

In the home network of this embodiment, as illustrated in FIG. 1, a smart phone 100 as a portable device, and a tablet 50 are provided in one home, and a recorder built-in television receiver 200, a television receiver 300, and a laptop computer 400 are placed.

Then, the smart phone 100 and the tablet 50 function as the content transmission device, the television receiver 300 and the laptop computer 400 function as the content reception device, and the recorder built-in television receiver 200 functions as a content transmission and reception function including both of the functions.

In a network configuration, a wireless access point 20, a router 12, a hub 11, the recorder built-in television receiver 200, and the television receiver 300 are connected to each other in a wired manner, and the smart phone 100, the tablet 50, and the laptop computer 400 communicate with each other through wireless LAN (Wifi), according to a wireless LAN standard such as an IEEE 802.11a/b/g/n/ac standard.

In the provision of the content, a broadcast radio wave transmitted from a broadcasting station 5 is received by an antenna 42, and is distributed to the recorder built-in television receiver 200 and the television receiver 300. The broadcast radio wave transmitted from the broadcasting station 5 can be received by the smart phone 100 and the tablet 50. In addition, the content providing server 6 distributes the content to the recorder built-in television receiver 200 and the television receiver 300 by a route such as the router 12 and the hub 11, through the Internet 60. In addition, the content providing server 6 is capable of distributing the content to the smart phone 100 and the tablet 50 from the base station 7, through a wireless line (long term evolution) such as an LTE line.

The smart phone 100 and the tablet 50 are capable of receiving the 4K/8K content and a 2K content which are distributed from the broadcasting station 5, and of distributing the contents to the recorder built-in television receiver 200 and the television receiver 300.

On the other hand, the recorder built-in television receiver 200 is capable of receiving the 4K/8K content to be displayed, and the television receiver 300 is capable of only receiving the 2K content to be displayed.

In the network, a standard internet protocol (IP) is used as a network protocol, and a transmission control protocol (TCP) and a user datagram protocol (UDP) are used as a high-order transport protocol. In the transmission of the content, a high-order application protocol, for example, a real-time transport protocol (RTP), a hyper text transfer protocol (HTTP), a file transfer protocol (FTP), or the like are used.

The smart phone 100, the tablet 50, the recorder built-in television receiver 200, the television receiver 300, the laptop computer 400, and the router 12 respectively possess an IP address identifying itself. In addition, a media access control (MAC) address of 48 bits is applied to an interface unit of each network communication process circuit. In the setting of the IP address with respect to each of the devices, for example, the router 12 is operated as a DHCP server by a dynamic host configuration protocol (DHCP), and the IP address of each of the devices is allocated from here.

As illustrated in FIG. 2, the smart phone 100 in configured such that a central processor unit (CPU) 102, a main memory 104, a wireless LAN unit 106, an RF unit 108, a baseband processor 110, a tuner 112, a demultiplexer 114, a decoder 116, an HDMI output unit 118, a display interface (I/F) 120, an audio I/F 130, a camera 140, a GPS 142, a distance image sensor 144, an acceleration rate sensor 146, a short-distance wireless unit 148, and a flash memory 150 are combined through a bus, as hardware. In addition, a display 122 and a touch panel 124 are connected to the display I/F 105, and a speaker 132 and a microphone 134 are connected to the audio I/F 109.

The CPU 102 is a calculation and control unit which controls each unit of the smart phone 100, and executes a program for transmitting a content, loaded on the main memory 104. The CPU 102 reads a program stored in the flash memory 150 in the main memory 104, and executes the program, and thus, performs various processes. Such a program or data may be stored in advance in the flash memory 150, may be input from a storage medium such as a USB memory, or may be downloaded from the external server or the like through a network. In addition, a function realized by the program may be realized by dedicated hardware.

The main memory 104 is a storage device which loads the program stored in the flash memory 150 and temporarily stores the program, or stores work data.

The wireless LAN unit 106 is a portion performing communication with respect to a nearby wireless access point 20 according to a standard of wireless LAN (for example, IEEE 802.11 a/b/g/n/ac, or the like).

The RF unit 108 is an interface device for converting a signal of the baseband processor 110 into a high-frequency signal of a wireless band, or converting the high-frequency signal of the wireless band into the signal of the baseband processor 110, in reverse. The smart phone 100 is capable of performing communication by using a 3G line or a 4G line through the RF unit 108, through the base station 7, or of performing communication with respect to the content providing server 6 by the Internet 60, and of downloading the content.

The baseband processor 110 is a processor controlling a module relevant to communication or call of the smart phone 100.

The tuner 112 receives the content of the digital broadcast service (terrestrial broadcast, satellite broadcast, or the like) distributed from the broadcasting station 5 (a content providing source) through an internal antenna of the smart phone 100, selects a desired channel from a plurality of channels, and demodulates a digital-modulated broadcasting program. In addition, as necessary, scramble of a broadcasting program, which is performed in order to enable only a channel contracted with the content providing source to be received, is cancelled by using an encryption/decryption program described below. The tuner 112 of the smart phone 100 of this embodiment, includes both of a 4K/8K tuner 112a and a 2K tuner 112b, which are capable of handling broadcast with respect to the 4K/8K content, and broadcast with respect to the content of the related art, such as SD/HD/Full HD.

The demultiplexer 114 is a portion which extracts sound data, projected image data, broadcasting program information, data, copy control information, and the like from the broadcasting program.

The decoder 116 is a portion which decrypts compressed sound data or projected image data, included in the contents accumulated in the broadcasting program input through the tuner 112 or in the flash memory 150, and decompresses the compressed sound data or projected image data to an original sound signal or an original projected image signal. The decoder 116 of the smart phone 100 of this embodiment includes both of a 4K/8K decoder 116a and a 2K decoder 116b, which are capable of handling the broadcast with respect to the 4K/8K content, and the broadcast with respect to the content of the related art.

The high-definition multimedia interface (HDMI; Registered Trademark) output unit 118 is a portion which converts digital data into a signal of HDMI, and outputs the converted data. A wired manner is illustrated in FIG. 2, but a wireless manner may be used.

The display I/F 120 is an interface connecting the display 122 and the touch panel 124 together. The display 122, for example, is a display device displaying image information to the user, such as a liquid crystal display or an organic electro-luminescence (EL) display, and a display service including a screen of approximately 3 inches to 5 inches is generally used. The touch panel 124 is an input device of a mechanism in which the user brings his finger or a touch pen into contact with the display 122, and thus, inputs data or a command.

The audio I/F 130 is an interface connecting the microphone 134 or the speaker 132. The microphone 134 is a device collecting a sound from the outside. The speaker 132 is a device outputting a sound.

The camera 140 images a circumstance around the smart phone 100, and retains the image in the flash memory 150 as image data.

The global positioning system (GPS) unit 142 is a device which receives a radio wave from an artificial satellite, and analyzes the received radio wave, and thus, obtains a position of a device.

The distance image sensor 144 is a sensor which images a peripheral target, and obtains a distance to the target.

The acceleration rate sensor 146 is a sensor which measures an acceleration rate of the smart phone 100. The measured acceleration rate, for example, is used for display switching of a screen, or the like.

The short-distance wireless unit 148 is a device for manipulating a digital device such as a nearby speaker, according to a communication standard such as Bluetooth (Registered Trademark).

The flash memory 150 is a non-volatile memory storing a program or data, with capacity which is generally greater than that of the main memory 104. The flash memory 150 is a storage device of comparatively high capacity, which stores various data items such as sound source data, moving image data, and image data, and a program such as application software of a program for transmitting a content.

The flash memory 150 stores a monitor identification program 152, a down-convert program 154, an encryption/decryption program 156, a device authentication program 158, a device information management program 160, and a recording and reproducing program 162, as a program executed by the CPU 102.

The monitor identification program 152 is a program which obtains a manufacturer name, a model, and a device type of the content reception device, by using a visible image imaged by the camera 140, a distance image imaged by the distance image sensor 144, and information transmitted and received through the wireless LAN unit 106 or the short-distance wireless unit 148.

The down-convert program 154 is a program which generates data of a content of which a resolution decreases from an original image.

The encryption/decryption program 156 is a program, which (1) decrypts a broadcasting program provided by the broadcasting station 5, which is received through the tuner 112, or a content provided by the content providing server 6, which is received through the wireless LAN unit 106, according to a predetermined procedure (for example, ARIB, Marlin, PlayReady, CMLA-OMA V2, or the like), defined/operated by the content providing source, (2) performs encryption according to a predetermined procedure defined/operated by the content providing source in order to record the content decrypted in (1), in a recording medium, and performs decryption in order to use the recorded content, (3) performs decryption according to a predetermined procedure defined/operated by the content providing source in order to decompress the content decrypted in (1) or (2), by the decoder 116, and then, to transmit the decompressed content to the external television receiver (the content reception device) through the HDMI output unit 118, and (4) performs decryption according to a predetermined procedure defined/operated by the content providing source in order to transmit the content decrypted in (1) or (2) to the other content reception device through the wireless LAN unit 106.

The device authentication program 158 is a program which authenticates whether or not it is a device regularly authorized with respect to the other digital device, according to a specific authentication protocol, and shares a key which is used for encryption/decryption of the content, in order to transmit the content of the copyright protection target through a wired or wireless network.

The device information management program 160 is a program which manages information relevant to a network connection device which is successful in authentication by the device authentication program 158, or information necessary for the device authentication process unit to perform device authentication.

The recording and reproducing program 162 performs recording control for recording the content in a recording medium such as the flash memory 150 or the memory card (not illustrated), and reproducing control for reproducing the content recorded in the recording medium.

As illustrated in FIG. 3, the recorder built-in television receiver 200 is configured such that a central processor unit (CPU) 202, a main memory 204, an HDMI input and output unit 206, a wired LAN unit 208, tuner 210, a demultiplexer 212, a decoder 214, a display I/F 216, an audio I/F 218, and an auxiliary storage I/F 220 are combined through a bus, as hardware. In addition, a display 250 is connected to the display I/F 216, and a speaker 260 and an input unit 270 are connected to the audio I/F 218.

The CPU 202 is a calculation and control unit which controls each unit of the recorder built-in television receiver 200, and executes a program for transmitting and receiving the content, loaded on the main memory 204. The CPU 202 reads a program stored in a flash memory 230 in the main memory 204, and executes the program, and thus, performs various processes. Such a program or data may be stored in the flash memory 230 in advance, may be input from a storage medium such as a USB memory, or may be downloaded from the external server or the like through a network. In addition, a function realized by the program may be realized by dedicated hardware.

The main memory 204 is a storage device which loads the program stored in the flash memory 230 and temporarily stores the program, or stores work data.

The high-definition multimedia interface (HDMI; Registered Trademark) input and output unit 206 is a portion which inputs a signal of HDMI and converts the input signal into digital data, or converts the digital data into the signal of HDMI and outputs the converted signal.

The wired LAN unit 208 is a portion which performs an interface process for communication, according to a standard of a wired network (for example, Ethernet (Registered Trademark)) connected to a port.

The tuner 210 receives the content of the digital broadcast service (terrestrial broadcast, satellite broadcast, or the like) distributed from the broadcasting station 5 (the content providing source) through an internal antenna of the recorder built-in television receiver 200, selects a desired channel from a plurality of channels, and demodulates a digital-modulated broadcasting program. The tuner 210 of the recorder built-in television receiver 200 of this embodiment, includes both of a 4K/8K tuner 210a and a 2K tuner 210b, which are capable of handling the broadcast with respect to the 4K/8K content and the broadcast with respect to the 2K content.

The demultiplexer 212 is a portion which extracts sound data, projected image data, broadcasting program information, data, copy control information, and the like from the broadcasting program.

The decoder 214 is a portion which decrypts compressed sound data or projected image data, included in the contents recorded in the broadcasting program input through the tuner 210, or in an HDD 222 or an optical disk device 224, and decompresses the compressed sound data or projected image data to an original sound signal or an original projected image signal. The decoder 214 of the recorder built-in television receiver 200 of this embodiment, includes both of a 4K/8K decoder 214a and a 2K decoder 214b, which are capable of handling the broadcast with respect to the 4K/8K content and the broadcast with respect to the 2K content.

The display I/F 216 is an interface connecting the display 250. The display 250, for example, is a display device which displays image information, such as a liquid crystal display or an organic electro-luminescence (EL) display, and a display service including a screen of approximately 20 inches to 40 inches is generally used.

The audio I/F 218 is an interface connecting a speaker 260 or a headphone (not illustrated).

The auxiliary storage I/F 220 is an interface connecting auxiliary storage device of capacity greater than that of the hard disk drive (HDD) 222, the main memory 204 of the optical disk device 224 or the like, or the flash memory 230. The optical disk device is a device which performs reading and writing on an optical disk medium such as a Blu-ray disc (Registered Trademark) or a digital versatile disc (DVD) (Registered Trademark).

The flash memory 230 is a non-volatile memory storing a program or data, with capacity which is generally greater than that of the main memory 204. The flash memory 230 is a storage device which stores various data items such as sound source data and moving image data, and a program such as application software of a program for transmitting and receiving a content.

The flash memory 230 stores a monitor identification program 232, a down-convert program 234, an encryption/decryption program 236, a device authentication program 238, a device information management program 240, and a recording and reproducing program 242, as a program executed by the CPU 202.

The monitor identification program 232 is a program which determines the type of content reception device (the type of encryption process described below), when the content is transmitted from the recorder built-in television receiver 200 (a content transmission and reception device) 200.

The down-convert program 234 is a program which generates data of a content of which a resolution decreases from an original image.

The encryption/decryption program 236 is a program, which (1) decrypts a broadcasting program provided by the broadcasting station 5, which is received through the tuner 210, or a content provided by the content providing server, which is received through the wired LAN unit 208, according to a predetermined procedure (for example, ARIB, DTCP-IP, Marlin, PlayReady, CMLA-OMA V2, or the like) defined/operated by the content providing source, (2) decrypts a content which is re-transmitted from the other content transmission device through the wired LAN unit 208, according to a predetermined procedure (for example, ARIB, DTCP-IP, Marlin, PlayReady, CMLA-OMA V2, or the like), defined/operated by the content providing source, (3) performs encryption according to a predetermined procedure defined/operated by the content providing source in order to record the content decrypted in (1) or (2) in the HDD 222 or a recording medium of the optical disk device 224, and performs decryption in order to use the recorded content, (4) performs decryption according to a predetermined procedure defined/operated by the content providing source in order to decompress the content decrypted in (1), (2), or (3), by the decoder 214, and then, to transmit the decompressed content to the external television receiver (the content reception device) through the HDMI input and output unit 206, and (5) performs decryption according to a predetermined procedure defined/operated by the content providing source in order to transmit the content decrypted in (1) or (3) to the other content reception device through the wired LAN unit 208.

The device authentication program 238 is a program which authenticates whether or not it is a device regularly authorized with respect to the other digital device, according to a specific authentication protocol, and shares a key which is used for encryption/decryption of the content, in order to transmit the content of the copyright protection target through a wired or wireless network.

The device information management program 240 is a program which manages information relevant to a network connection device which is successful in authentication by the device authentication program 238, or information necessary for the device authentication program 238 to perform device authentication.

The recording and reproducing program 242 performs recording control for recording the content in the HDD 222 or the recording medium of the optical disk device 224, and reproducing control for reproducing the content recorded in the recording medium. The content of the copyright protection target is recorded by being encrypted, and is reproduced by being decrypted, according to a predetermined procedure, by using the encryption/decryption program 236.

The input unit 270 is an input device for the user to perform a manipulation with respect to the recorder built-in television receiver 200, and includes a remote controller, a mouse, a keyboard, or the like.

As illustrated in FIG. 4, the television receiver (a content receiver) 300 is configured such that a CPU 302, a main memory 304, an HDMI input unit 306, a wired LAN unit 311, a tuner 308, a demultiplexer 310, a decoder 312, a display I/F 314, and an audio I/F 316 are combined through a bus, as hardware. In addition, a display 350 is connected to the display I/F 314, and a speaker 360 and an input unit 370 are connected to the audio I/F 316.

The configuration of the television receiver 300 is approximately identical to the configuration of the recorder built-in television receiver 200 illustrated in FIG. 3, except for not having a recorder function of the auxiliary storage I/F, the HDD, the optical disk device, or the like.

In addition, a program stored in the flash memory 330, only includes an encryption/decryption program 336, a device authentication program 338, and a recording and reproducing program 342, which are used for transmitting a content, and but does not include a monitor identification program, a down-convert program, and a device management program.

In addition, the tuner 308 is used when a broadcast wave is received and demodulated, but when a content is received from a content transmitter through a network, the tuner 308 is not used. Further, a projected image content which can be processed in the television receiver of this embodiment, is less than or equal to 2K, and thus, the tuner 308 only includes a 2K tuner 308b, and the decoder 312 only includes a 2K decoder 312b.

Next, a function and a data flow in the content transmission device will be described by using FIG. 5.

First, an encryption process described in this embodiment will be described.

Recently, a high-bandwidth digital content protection (HDCP) has been adopted as the encryption process of the digital signal for HDMI. In this embodiment, an HDCP standard of the encryption process with respect to the content of less than or equal to 2K will be described as HDCP1, and an HDCP standard of the encryption process with respect to the 4K/8K content, which is an expansion standard, will be described as HDCP2. In addition, in the encryption process used in copy protection on a home network/a personal network of a wired LAN or a wireless LAN, the encryption process with respect to the content of less than or equal to 2K will be described as an encryption process I, and the encryption process with respect to the 4K/8K content will be described as an encryption process II.

The content transmission device (the smart phone 100 and the recorder built-in television receiver 200) illustrated in FIG. 5, has a function of outputting both of the 4K/8K content received from the broadcasting station 5, and the content of less than or equal to 2K (hereinafter, a 2K content) to the other content reception device.

Initially, a method will be described in which the received content is output in an HDMI format to the external monitor, while maintaining an uncompressed digital format.

When the 4K/8K content is received, a desired channel of a plurality of channels is demodulated by a 4K/8K tuner unit 401a, and as necessary, scramble is cancelled, and then, the content is input to a demultiplexer unit 402a. The demultiplexer unit 402a separates the sound data and the projected image data from a broadcast signal, and inputs the data to a 4K/8K decoder unit 403a.

The 4K/8K decoder unit 403a decodes the compressed sound data and projected image data in an uncompressed state, and outputs the decoded data to an HDMI process unit 405a. In the HDMI process unit 405a, predetermined encryption is performed according to a procedure of HDCP2, and the data is converted into a signal of an HDMI standard, and is output from an HDMI terminal 410. Such a data flow is effective in the case of a monitor that the content reception device is capable of displaying the 4K/8K content.

Similarly, when the 2K content is received, a desired channel is demodulated by a 2K tuner unit 401b, and as necessary, scramble is cancelled, and then, the content is input to a demultiplexer unit 402b. The demultiplexer unit 402b separates the sound data and the projected image data from the broadcast signal, and inputs the data to a 2K decoder unit 403b.

The 2K decoder unit 403b decodes the compressed sound data and projected image data in an uncompressed state, and outputs the decoded data to an HDMI process unit 405b. In the HDMI process unit 405b, predetermined encryption is performed according to a procedure of HDCP1, and the data is converted into a signal of an HDMI standard, and is output from the HDMI terminal 410. Such a data flow is effective in the case of a monitor that the content reception device is capable of displaying the content of less than or equal to 2K.

In addition, a data flow will be described in which the received 4K/8K content is HDMI-output with respect to a monitor capable of displaying the content of less than or equal to 2K (the content reception device).

Only in a case where the content providing source admits a change in the resolution of the 4K/8K content, a screen service, a brightness range, and the like, a signal output from the 4K/8K decoder unit 403a is down-converted by a down-convert unit 404, and the 2K content is encrypted by the HDMI process unit 405b according to HDCP1 as the encryption process, is converted into the signal of the HDMI standard, and is output from the HDMI terminal 410.

Here, one or more HDMI terminals 410 are provided, each of the terminals may be shared by the HDMI process unit 405a and the HDMI process unit 405b, or a predetermined terminal may be explicitly allocated thereto.

Next, a method will be described in which the received content is output to the other content reception device through a network while maintaining a compressed digital format.

When the 4K/8K content is received, a authentication process described below is executed by using an authentication unit 406, and only in a case where it is possible to confirm that the content reception device, which is a transmission destination, is a regular device, the output signal from the demultiplexer unit 402a is input into a communication process unit 407a.

The communication process unit 407a performs encryption by using key information shared by the authentication unit 406 according to the encryption process II as the encryption process, a signal is transmitted in a wireless manner, or is transmitted by a wired LAN terminal 414 in a wired manner, as a radio wave, from a wireless LAN unit 412 to the content reception device.

Similarly, when the content of less than or equal to 2K is received, the authentication process described below is executed by using the authentication unit 406, and only in a case where it is possible to confirm that the content reception device, which is a transmission destination, is a regular device, a signal from the demultiplexer unit 402b is input into a communication process unit 407b. The communication process unit 407b performs encryption by using key information shared by the authentication unit 406 according to the encryption process I as the encryption process, a signal is transmitted in a wireless manner, or is transmitted by the wired LAN terminal 414 in a wired manner, as a radio wave, from the wireless LAN unit 412 to the content reception device. Here, the authentication unit 406 performs authentification by using different authentication algorithms or different various parameters between the 4K/8K content and the 2K content. In addition, in the communication process unit 407a and the communication process unit 407b, key information having different values or different data lengths is used.

In addition, a data flow will be described in which network output is performed with respect to a content reception device which is not capable of reproducing or recording the received 4K/8K content as it is, or a content reception device which desires to reduce a transmission amount or a recording data amount on a network.

Only in a case where the content providing source admits a change in the resolution of the 4K/8K content, the screen service, the brightness range, or the like, the signal from the demultiplexer unit 402a is input into the 4K/8K decoder unit 403a, the input data is decoded to uncompressed data, and then, the signal is down-converted by the down-convert unit 404. After that, the data is compressed by an encoding unit 408, and the compressed data is output to the communication process unit 407b. The communication process unit 407b performs encryption by using key information shared by the authentication unit 406 according to the encryption process I as the encryption process, and transmits the signal in a wireless manner or transmits the signal by the wired LAN terminal 414 in a wired manner, as a radio wave, from the wireless LAN unit 412 to the content reception device.

Next, a function and a data flow in the content reception device will be described by using FIG. 6.

Figure 6:
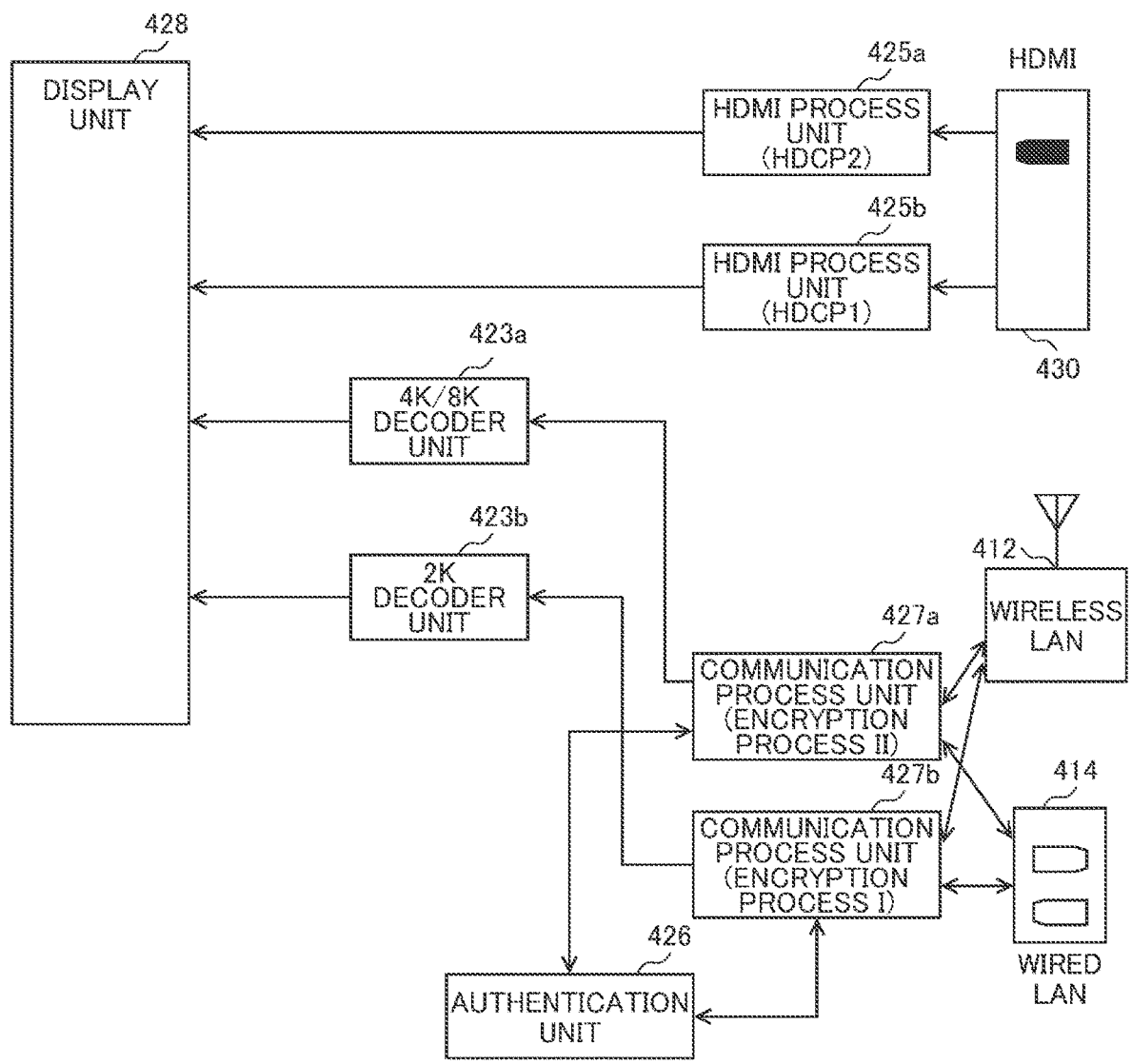
FIG. 6 is a function and a data flow diagram in the content reception device.

FIG. 6 is a function and a data flow diagram of the content reception device.

The content reception device illustrated in FIG. 6 has a function of receiving both of the 4K/8K content and the content of less than or equal to 2K, and of displaying the content on a built-in or external monitor.

An HDMI signal input from an HDMI terminal 430 is decrypted by an HDMI process unit 425*a* at the time of the 4K/8K content, is output to a display unit 428, and is displayed. In addition, the HDMI signal is decrypted by an HDMI process unit 425*b* at the time of the 2K content, is output to the display unit 428, and is displayed.

On the other hand, the signal received by the wireless LAN unit 412 or the wired LAN terminal 414 is decrypted by a communication process unit 427*a* with a key which is shared in the authentication process with respect to the content transmission device by an authentication unit 426, according to the encryption process II, at the time of the 4K/8K content, and is output to a 4K/8K decoder unit 423*a*. The 4K/8K decoder unit 423*a* decodes the input signal, outputs the decoded signal to the display unit 428, and displays the output signal. Similarly, the signal is decrypted by a communication process unit 427*b* with a key which is shared in the authentication process with respect to the content transmission device by the authentication unit 426, according to the encryption process I, at the time of the 2K content, and is output to a 2K decoder unit 423*b*. The 2K decoder unit 423*b* decodes the input signal, outputs the decoded signal on the display unit 428, and displays the displayed signal.

Here, even though it is not illustrated, the content reception device may include a recording and reproducing unit with respect to an HDD or an optical disk, decrypts the compressed digital content, which is received and encrypted by the wireless LAN unit 412 or the wired LAN unit 414, by the communication process unit 472*a* or the 427*b*, and then, performs re-encryption according to a predetermined procedure admitted by the content providing source, and records the content in a recording medium such as an HDD or an optical disk.

Next, a data structure relevant to content transmission and reception will be described by using FIG. 7A(a) to FIG. 7D.

FIGS. 7A(a) and 7A(b) are diagrams illustrating an example of a content transmission packet of encryption process I support.

Figure 7B:
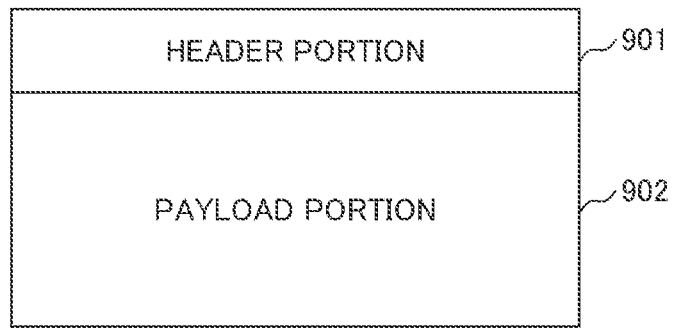
FIGS. 7B(a) and 7*b*(*b*) are diagrams illustrating an example of a header portion of the content transmission packet of encryption process II support.
Figure 7B:
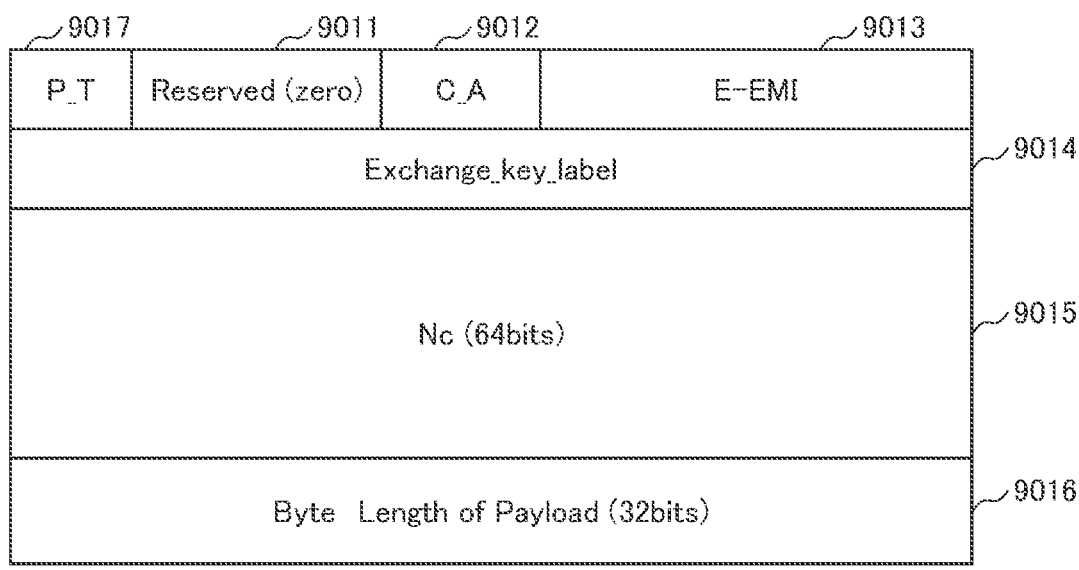

FIGS. 7B(a) and 7B(b) are diagrams illustrating an example of a header portion of the content transmission packet of encryption process II support.

Figure 7C:
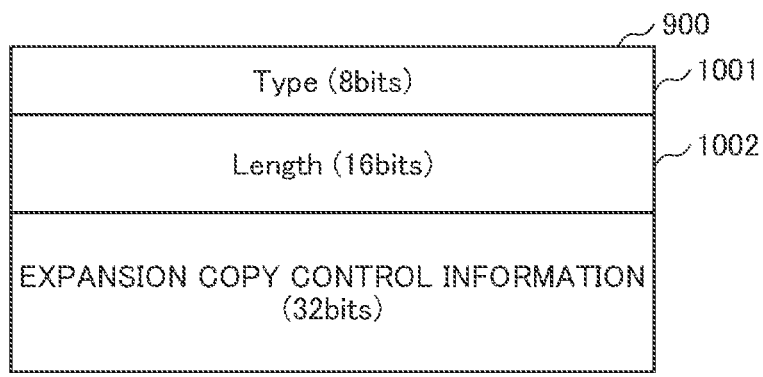
FIGS. 7C(a) and 7C(b) are diagrams illustrating an example of expansion copy control information in the encryption process II support.
Figure 7C:
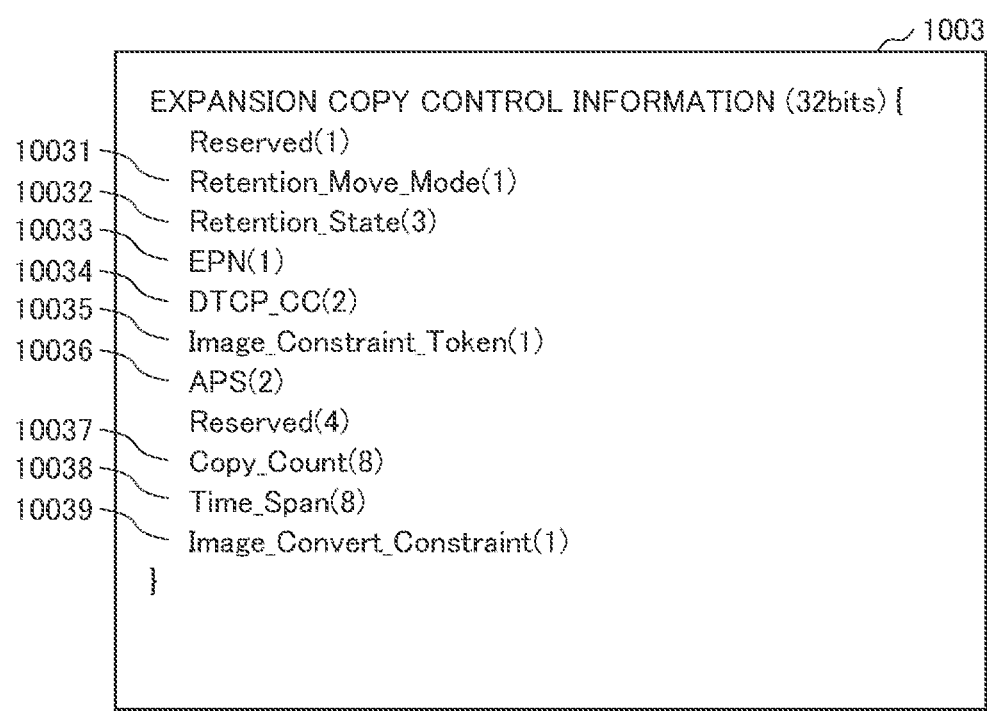

FIGS. 7C(a) and 7C(b) are diagrams illustrating an example of expansion copy control information in the encryption process II support.

Figure 7D:
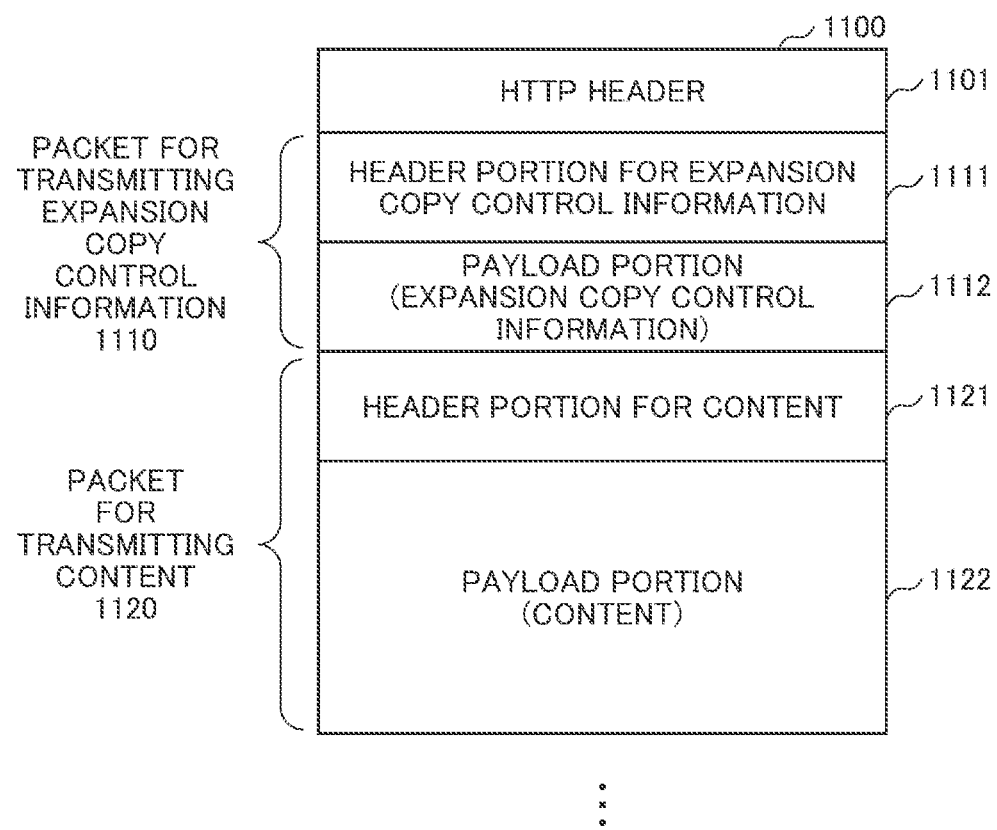
FIG. 7D is a diagram illustrating an example of data in a case where a content is transmitted by using an HTTP protocol according to a format illustrated in FIGS. 7B(a) and 7B(b).

FIG. 7D is a diagram illustrating an example in a case where a content is transmitted by using an HTTP protocol according to a format illustrated in FIGS. 7B(a) and 7B(b).

As illustrated in FIG. 7A(a), the content transmission packet according to the encryption process I is a data packet exchanged between the content transmission device and the content reception device, and includes a header portion 801 and a payload portion 802.

As illustrated in FIG. 7A(b), the header portion 801 includes a reservation region (Reserved) 8011, an encryption method (C_A) 8012, an encryption mode (E-EMI) 8013, an exchange key label (Exchange_Key_Label) 8014, a random value (Nc) 8015, and a payload service (byte length of payload) 8016.

The reservation region (Reserved) 8011 is a reservation region, and 0 is set.

The encryption method (C_A) 8012 indicates an encryption method of the payload portion, and for example, clearly indicates encryption using AES having a key length of 128 bits, the type of key to be applied, or the like.

The encryption mode (E-EMI) 8013 indicates an encryption mode of the payload portion, and is used for calculating a content key along with the random value (Nc) 8015.

The exchange key label (Exchange_Key_Label) 8014 sets a label specifying a key exchanged by the authentication process (described below), is set.

In the payload service (byte length of payload) 8016, a payload service of the packet is set.

The payload portion 802 is a portion which stores an encryption content.

As illustrated in FIG. 7B(a), a content transmission packet 900 according to the encryption process II is a data packet expanding corresponding to expansion copy control information, and includes a header portion 901 and a payload portion 902.

As illustrated in FIG. 7B(b), the header portion 901 includes a payload type (P_T) 9017, a reservation region (Reserved) 9011, an encryption method (C_A) 9012, an encryption mode (E-EMI) 9013, an exchange key label (Exchange_Key_Label) 9014, a random value (Nc) 9015, and a payload service (byte length of payload) 9016.

The payload type (P_T) 9017 is an identifier indicating whether the payload is the content or the expansion copy control information, and for example, in the case of the content, 0 is set, and in the case of the expansion copy control information, 1 is set.

The reservation region (Reserved) 9012 is a reservation region, and 0 is set. The other portions are identical to those of a header portion of a content transmission packet of the related art.

The payload portion 902 includes the encryption content or encrypted expansion copy control information (described below).

The encryption mode (E-EMI) 9013 in a case where the payload portion 902 is the expansion copy control information, may be identical to that set in the content, or may be different from that set in the content.

In the case of using this format, in an encryption method of the payload portion 902, an exchange key, and encryption is performed by using a content key which is generated on the basis of the encryption mode (E-EMI) 9013 and the random value (Nc) 9015.

In addition, for example, the value of the expansion copy control information and the content key encrypting the content are correlated by hashing the expansion copy control information, or by setting an exclusive OR with respect to the random value (Nc) 9015 included in the header portion of the content packet as an encryption key of the content, and thus, it is possible to prevent falsification in the expansion copy control information even in the case of being transmitted without encrypting the expansion copy control information.

As illustrated in FIG. 7C(a), the expansion copy control format includes Type 1001, Length 1002, and expansion copy control information 1003.

The Type 1001 is an ID indicating the type of expansion copy control information, and is used for identifying the format of the expansion copy control information of the packet.

The Length 1002 indicates the service of the expansion copy control information included in the packet.

The expansion copy control information 1003 indicates the copy control information of the content, and for example, as illustrated in FIG. 7C(b), includes each entry of Retention_Move_Mode 10031, Retention_State 10032, EPN 10033, DTCP_CCI 10034, Image_Constraint_Token

10035, APS 10036, Copy_Count 10037, Time_Span 10038, and Image_Convert_Constraint 10039.

The Retention_Move_Mode 10031 is an entry indicating temporary accumulation availability.

The Retention_State 10032 is an entry indicating temporary accumulation time.

The EPN 10033 is an entry indicating availability of copy non-constraint operation with output protection.

The DTCP_CCI 10034 is an entry indicating the copy control information defined by a DTCP method.

The Image_Constraint_Token 10035 is an entry indicating the presence or absence of constraint in the projected image output signal.

The APS 10036 is an entry indicating analog output copy control information.

The Copy_Count 10037 is an entry indicating the number of times of copy.

The Time_Span 10038 is an entry indicating viewing limit.

The Image_Convert_Constraint 10039 is an entry indicating presence or absence of admission of a change (for example, down-convert) in the resolution of the received content, the screen service, the brightness range, and the like.

The packet transmitting the expansion copy control information handles the first bit of the data as an identifier for identifying a packet for transmitting expansion copy control information and a packet for transmitting a content, and may be not only in a format illustrated in FIG. 7B(a), which is similar to the content transmission packet format, but also in a format where, for example, a header includes the Type 1001 and the Length 1002 in a configuration example of FIG. 7C(a), and the payload portion only includes the expansion copy control information 1003, insofar as being in a format where a content transmission packet format in FIG. 7A(a) can be discriminated by setting the identifier to 1 in the case of the expansion copy control information.

The expansion copy control information is transmitted in the format as described above, and thus, for example, copy control information which is not defined by the current DTCP-IP method, can be easily transmitted in a format which does not depend on the format of the content. In addition, according to this format, it is possible to simply discriminate whether the packet is the content or the expansion copy control information, and to easily perform addition, a change, and the like of the copy control information.

In a case where the content is transmitted by using the format illustrated in FIGS. 7B(a) and 7B(b) and a hypertext transfer protocol (HTTP), for example, transmission is performed in the format as illustrated in FIG. 7D. Here, the TCP is used as a transport layer protocol, a TCP header is omitted. Furthermore, a real-time transport protocol (RTP) may be used instead of the HTTP.

Transmission data 1100 in a case where the content is transmitted by using the format illustrated in FIGS. 7B(a) and 7B(b) and FIGS. 7C(a) and 7C(b), includes an HTTP header 1101, a packet 1110 for transmitting expansion copy control information, and a packet 1120 for transmitting a content.

The packet 1110 for transmitting expansion copy control information includes a header portion 1111 for expansion copy control information and a payload portion (the expansion copy control information) 1112. One or more packets 1110 for transmitting expansion copy control information may be included in the transmission data 1100. For example, different packets 1110 for transmitting expansion copy control information may be included for each service/channel or each type of content (the content of less than or equal to 2K, a 4K content, a 8K content, and the like) of the content providing source, the broadcasting station, or the like.

The packet 1120 for transmitting a content includes a header portion 1121 for a content and a payload portion (a content) 1122.

The header portion 1111 for expansion copy control information is a header portion in which the payload type (P_T) 9017 is set to 1 in the header portion of the content transmission packet illustrated in FIG. 7B(a).

The payload portion (the expansion copy control information) 1112 stores the expansion copy control information which is encrypted on the basis of information of the exchange key exchanged in a device authentication process (described below) between the content transmission device and the content reception device, and the encryption mode (E-EMI) 9013 or the random value (Nc) 9015 set in the header portion 1111 for expansion copy control information.

The configuration of the expansion copy control information 1003 is not limited to the configuration example of FIGS. 7C(a) and 7C(b), and the expansion copy control information 1003 may simultaneously include information items in a plurality of formats.

The packet 1110 for transmitting expansion copy control information indicates copy control information of the content which is subsequently transmitted, and is inserted to the transmission data whenever at least the copy control information of the content is changed.

The header portion 1121 for a content is a header portion in which the payload type (P_T) is set to 0 in the header portion of the content transmission packet illustrated in FIG. 7B(a).

The payload portion (content) 1122 sets the content which is encrypted on the basis of the information of the exchange key exchanged in the device authentication process (described below) between the content transmission device and the content reception device, and the encryption mode (E-EMI) 9013 or the random value (Nc) 9015 set in the header portion 1121 for a content.

Next, a table group relevant to device information will be described by using FIG. 8A to FIG. 8C.

FIG. 8A is a diagram illustrating an example of a device information definition table.

FIG. 8B is a diagram illustrating an example of a device control information table.

FIG. 8C is a diagram illustrating an example of a device information table.

The table group relevant to such device information includes a device information definition table 5100, a device control information table 5200, and a device information table 5300, and is stored in the storage device of the content transmission device (for example, in the case of the smart phone 100 of FIG. 2, the flash memory 150).

The device information definition table 5100 is a table for defining various constants relevant to a device per content transmission, and as illustrated in FIG. 8A, includes a authentication device maximum number 5101, a counter maximum value 5102, a simultaneous access maximum number 5103, and a simultaneous access maximum number (4K/8K) 5104.

The authentication device maximum number 5101 is a field indicating the maximum number in which the device authentication can be executed between the content transmission device and the content reception device at the time of the device authentication process (described below).

The counter maximum value 5102 is a field indicating the maximum value of a counter, which is effective for the authentication process.

The simultaneous access maximum number 5103 is a field indicating the maximum number of a device which simultaneously admits an access request with respect to the content of less than or equal to 2K.

The simultaneous access maximum number (4K/8K) 5104 is a field indicating maximum number of a device which simultaneously admits an access request with respect to a higher-image quality 4K/8K content.

The device control information table 5200 illustrated FIG. 8B is a table storing information which is used for controlling the device.

An exchange key 5220 is a field storing the key information used in the encryption and decryption process at the time of performing the content transmission between the content transmission device and the content reception device, or additional information thereof (a label, the type of key, or the like).

The number 5221 of authentication devices is a field storing the number of content reception devices subjected to the device authentication with respect to the own device. In a case where the value reaches the authentication device maximum number 5101, content transmission device does not execute the subsequent device authentication process, or does not receive a device authentication request from the content reception device.

Similarly, in a case where the value of the number 5222 of simultaneous accesses and the number 5223 of simultaneous accesses (4K/8K) reaches the simultaneous access maximum number 5103 and the simultaneous access maximum number (4K/8K) 5104, the content transmission device does not execute the subsequent content output, or does not receive the subsequent content transmission request from the content reception device or the user.

The device information table 5300 is a table storing the information of the device transmitting the content, and as illustrated in FIG. 8C, includes an ID 5301, a device ID 5302, address information 5303, a counter value 5304 for authentication, a transmission status 5305, a manufacturer name 5310, a format 5311, a device type 5312, a resolution 5320, an HDR 5321, an HDCP version 5322, the number 5323 of input terminals, the number 5324 of output terminals, an encryption standard version 5330, the number 5331 of terminals, a wireless standard 5332, and a velocity 5333.

The ID 5301 is a field indicating a registration number of the table.

The device ID 5302 is a field storing an identifier for uniquely identifying each of the devices. The device ID 5302 is device specific information which is generated by a specific authentication agency or license manage agency, is retained in advance in a non-volatile memory at the time of manufacturing each of the devices, or is safely recorded in the non-volatile memory after a specific registration process is executed after being purchased, and has a unique value with respect to each of the devices. The device ID 5302 may include information of a public key and the like, in addition to a manufacturing serial number.

The address information 5303 is a field storing an IP address (IPv4/IPv6), a MAC address, or the like of each of the devices on a network. The IP address may be limited to an address form which is assumed to be used at home, such as a private address or a local address.

The counter value 5304 for authentication is a field storing the current value of the counter for authentication of the device.

The transmission status 5305 is a field storing a content transmission circumstance (for example, during access, stop, or the like) with respect to the content reception device.

The manufacturer name 5310 is a field storing a manufacturer name of the device.

The format 5311 is a field storing a model number of the device.

The device type 5322 is a field storing a category as a digital device, such as a television receiver, a smart phone, a tablet, and a PC.

The resolution 5320 to the number 5324 of output terminals are information relevant to an HDMI interface (the HDMI output unit 118 of FIG. 2, the HDMI input and output unit 206 of FIG. 3, and the HDMI input unit 306 of FIG. 4) of the device. In the resolution 5320, a resolution relevant to the display of the device is stored, a value commonly known as "1080i" and "1080p" is stored at the time of a full HD (2K), and a value indicating "2160p" is stored at the time of 4K. The HDR 5321 is a field storing the presence or absence of support of the HDR. The high dynamic range (HDR) is a method in which a plurality of images having different exposures are synthesized in projected image expression, and a range expands in which gradation expression can be performed. The HDCP version 5322 is a field storing the version of the HDCP on which the corresponding HDMI interface is mounted. Each of the number 5323 of input terminals and the number 5324 of output terminals is a field storing the number of HDMI input terminals and the number of HDMI output terminals.

The encryption standard version 5330 to the velocity 5333 are information relevant to a network of the device. The encryption standard version 5330 is a field storing an encryption standard version which is used at the time of performing transmission through a network. The number 5331 of terminals is a field storing the number of Ethernet (Registered Trademark) terminals in a wired LAN. The wireless standard 5332 is a field storing a wireless standard supported by the device, and stores a value indicating the standard, such as "IEEE802.11b/g/n/ac". The velocity 5332 is a communication velocity in the network, and stores a value indicating a velocity, such as "100 Mbps/1 Gbps".

Next, control information associated with a content will be described by using FIG. 9A to FIG. 9C.

FIG. 9A is a diagram illustrating an example of a content availability descriptor.

FIG. 9B is a diagram illustrating an example of a digital copy control descriptor.

FIG. 9C is a diagram illustrating an example of a down-convert constraint descriptor.

A content availability descriptor 1200, a digital copy control descriptor 1300, and a down-convert constraint descriptor 1400 are information which is added to the content which is distributed by the broadcasting station 5 or the content providing source of the content providing server 6, and describes a usage constraint of the distributed content. A device receiving such a content is referred in a case where the information is managed (output availability with respect to the other device, the presence or absence of encryption with respect to an output content, encryption mode, and recording control).

The content availability descriptor 1200, for example, is service description table (SDT) or an event information table (EIT) of service information (SI: broadcasting program arrangement information).

The content availability descriptor 1200 indicates information controlling recording of the received content or output with respect to the other content reception device, and is information which is added in order for the providing source of the content (for example, a copyrighter side such as the broadcasting station or the content service provider) to control recording/output with respect to the content. The content availability descriptor 1200 is used by being combined with the digital copy control descriptor 1300 or the down-convert constraint descriptor 1400 described below.

As illustrated in FIG. 9A, the content availability descriptor 1200 includes a copy constraint mode (copy_restriction_mode) 1201, a resolution constraint bit (image_constraint_token) 1202, a temporary accumulation control bit (retention_mode) 1203, temporary accumulation admission time (retention_state) 1204, an output protection bit (encryption_mode) 1205, a remote access constraint mode (remote_access_restriction_mode) 1206, and a down-convert constraint mode (downconvert_restriction_mode) 1207. Furthermore, the configuration of the content availability descriptor 1200 may include other information items, but is not limited to such a configuration example.

The copy constraint mode (copy_restriction_mode) 1201 indicates a mode of a copy number constraint, and is defined according to an operation rule of a content provider. For example, in a case where such a value is "0", it is indicated that the copy number constraint is operated, and in a case where the value is "1", it is indicated that the copy number constraint is not operated. In addition, in a case where the information is not included (is not arranged), it is assumed that "1" is set as a default.

The resolution constraint bit (image_constraint_token) 1202 is information indicating the presence or absence of an image quality constraint of the projected image signal which is output from the digital projected image/sound output terminal. For example, in a case where the value is "0", a resolution of projected image sound output is constrained, and in a case where the value is "1", the resolution of the projected image sound output is not constrained.

The temporary accumulation control bit (retention_mode) 1203 is information indicating whether or not temporary accumulation of the content which is received with a condition, is admitted. For example, in a case where the value is "0", the temporary accumulation is capable of being performed even in a case where the digital copy control descriptor 1300 described below is "copy never", and in a case where the value is "1", the temporary accumulation is not capable of being performed.

The temporary accumulation admission time (retention_state) 1204 indicates temporary accumulation admission time after receiving the content, and for example, information such as no constraint, 1 hour and 30 minutes, 3 hours, 1 day, and 1 week, are set.

The output protection bit (encryption_mode) 1205 is information indicating the presence or absence of output protection when the digital copy control descriptor 1300 described below outputs the content of "copiable without any constraint condition" from a digital input and output terminal. For example, in a case where the value is "0", an output protection process is performed, and in a case where the value is "1", the output protection process is not performed.

The remote access constraint mode (remote_access_restriction_mode) 1206 indicates a usage constraint mode of the received content from a terminal outside the house, such as a visiting destination or a separate house of the user, and is determined according to an operation rule of the content provider. For example, in a case where the value is "0", it is indicated that use in a remote access is inhibited, and in a case where the value is "1", it is indicated that there is no constraint. The value is used in the subsequent process, and thus, the content providing source is capable of constraining the remote access with respect to the content.

The down-convert constraint mode (downconvert_restriction_mode) 1207 is information indicating whether or not the down-convert of the resolution of the content, the screen service, the brightness range, or the like, is admitted. For example, the down-convert is inhibited at the time of "1", and the down-convert is admitted at the time of "0".

The digital copy control descriptor 1300 indicates information controlling a copy generation in the digital recording device, and is information which is added in order for the providing source of the content (for example, the copyrighter side such as the broadcasting station or the content service provider) to transmit information relevant to recording/copy with respect to the content to the recording device in the case of performing digital copy and analog copy.

As illustrated in FIG. 9B, the digital copy control descriptor 1300 includes digital copy control information (digital_recording_control_data) 1301, copy control format information (copy_control_type) 1302, and analog output copy control information (APS_control_data) 1303. Furthermore, the configuration of the digital copy control descriptor 1300 includes other information items, but is not limited to the configuration example.

The digital copy control information (digital_recording_control_data) 1301 is information controlling the copy generation of the received content. For example, in a case where the value is "00", "copiable without any constraint condition" is set, in a case where the value is "01" or "11", "copy never" is set, and in a case where the value is "10", "copiable only in single generation".

The copy control format information (copy_control_type) 1302 is information of a format controlling the copy generation of the received content. For example, in a case where the value is "01", the content is encrypted by using an encryption scheme designated by the providing source of the content (for example, DTCP, DTCP-IP, windows media DRM, or the like), and is output from the digital input and output terminal, and in a case where the value is "11", the content is output from the digital input and output terminal without being encrypted.

The analog output copy control information (APS_control_data) 1303 is information controlling copy of analog output in a case where the value of the digital copy control format information 1301 described above is "01" or "11". For example, in a case where the value is "00", it is copiable without any constraint condition, and in the other case, the copy is constrained in any constraint condition.

The down-convert constraint descriptor 1400 is information describing a condition at the time of down-converting the content, and as illustrated in FIG. 9C, includes a down-convert target content (downconvert_objection) 1401, down-convert constraint date and time (downconvert_restriction_date) 1402, simul broadcasting program information (simul_program_information) 1403, and a down-convert condition (downconvert_condition) 1404.

The down-convert target content (downconvert_target_content) 1401 is information relevant to a condition of a content which is a down-convert target. For example, information such as "resolution of 1920×1080 (1080p) and HDR support" or "resolution of greater than or equal to resolution of 3840×2160 (2160p)" is stored.

The down-convert constraint date and time (downconvert_restriction_date) 1402 is information relevant to date and time when the down-convert is performed. For example, information such as "down-convert is inhibited until 2018/3/31" or "down-convert is admitted after 2018/4/1" is stored.

The simul broadcasting program information (simul_program_information) 1403 is distribution information of a target content to be subjected to down-convert. For example, information which is simultaneously distributed by a broadcast wave, and accesses "distributed at the same time by 2K tuner", or "URL:http://www.aaa.co.jp" by being distributed in streaming, and thus, is capable of being viewed by the Internet browser, is stored.

The down-convert condition (downconvert_condition) 1404 is information relevant to a condition to which range the convert can be performed, in a case where the down-convert of the content is admitted. For example, in a case where the down-convert target content corresponds to the HDR, information such as "changeable to standard dynamic range (SDR) or low dynamic range (LDR) in hybrid log-gamma (HLG) method, but unchangeable in HDR 10 method" or "unchangeable to resolution of 720×480 or 720×576", is stored.

In addition to the above description, the number of simultaneous outputs constraining the number of times of copy and the number of outputs with respect to the other device in a case where the down-convert is admitted may be included.

Next, a control table to be referred when the content transmission device and the content reception device perform content output or content recording, will be described by using FIG. 10 and FIG. 11.

FIG. 10 is a diagram illustrating an example of output control rules by the digital copy control descriptor and the content availability descriptor.

FIG. 11 is a diagram illustrating an example of a digital content recording control table.

Output control rules 1500 by the digital copy control descriptor and the content availability descriptor are a table indicating a constraint condition at the time of performing output from the content transmission device, and an operation at that time, and as illustrated in FIG. 10, includes sections of a copy control format information (copy_control_type) condition 1501, a digital copy control information (digital_recording_control_data) condition 1502, an output protection bit (encryption_mode) condition 1503, a down-convert constraint mode (downconvert_restriction_mode) condition 1504, and an output operation 1505.

The copy control format information (copy_control_type) condition 1501 and the digital copy control information (digital_recording_control_data) condition 1502 are a condition relevant to the entry of the digital copy control descriptor 1300 illustrated in FIG. 9B, and the output protection bit (encryption_mode) condition 1503 and the down-convert constraint mode (downconvert_restriction_mode) condition 1504 are a condition relevant to the entry of the content availability descriptor 1200 illustrated in FIG. 9A, and is information which is added to the content distributed from the broadcasting station 5 or the content providing server 6.

When such conditions are satisfied, it is indicated that an operation described in the output operation 1505 is performed with respect to the output availability of the digital content, the presence or absence of the encryption, and the encryption mode, from a digital output terminal of the content transmission device receiving the content from the broadcasting station 5 or the content providing server 6. Here, the digital output terminal is a concept including an output terminal relevant to the digital data, such as the Ethernet standard terminal and the HDMI terminal, and a terminal transmitting the digital data in a wireless manner.

For example, when the copy control format information condition 1501 is "01", the digital copy control information condition 1502 is "00", and the output protection bit condition 1503 is "1", it is indicated that it is possible to output the content from the digital output terminal without performing encryption, as the output operation, and when the copy control format information condition 1501 is "01", the digital copy control information condition 1502 is "01", and the down-convert constraint mode condition 1504 is "0", it is indicated that the copy is not admitted, but it is possible to down-convert the received content, to encrypt the content, and to output the content from the digital output terminal, as the output operation.

Furthermore, when the down-convert is performed, the content transmission device is also constrained to a requirement defined in the down-convert constraint descriptor 1400 illustrated in FIG. 9C.

A digital content recording control table 1600 is a table indicating a constraint condition when the digital device recording the digital content, including the content transmission device and the content reception device, records the content in the recording device, and outputs a sound, and an operation at that time, and as illustrated in FIG. 11, includes sections of a copy control format information (copy_control_type) condition 1601, a digital copy control information (digital_recording_control_data) condition 1602, an output protection bit (encryption_mode) condition 1603, a down-convert constraint mode (downconvert_restriction_mode) condition 1604, a recording control operation 1605, and a sound output operation 1606.

The copy control format information (copy_control_type) condition 1601 and the digital copy control information (digital_recording_control_data) condition 1602 are a condition relevant to the entry of the digital copy control descriptor 1300 illustrated in FIG. 9A, and the output protection bit (encryption_mode) condition 1603 and the down-convert constraint mode (downconvert_restriction_mode) condition 1604 are a condition relevant to the entry of the content availability descriptor 1200 illustrated in FIG. 9A. The content reception device and the content transmission device execute recording control of the digital content which is input from the digital input terminal, with reference to such conditions. Similarly, it is indicated that the operation described in the sound output operation 1606 is performed with respect to the sound output of the digital content which is input from the digital input terminal.

For example, when the copy control format information condition 1601 is "01", the digital copy control information condition 1602 is "00", and the output protection bit condition 1603 is "1", it is indicated that it is possible to record the content which is input from the digital input terminal without performing encryption, and when the copy control format information condition 1601 is "01", the digital copy control information condition 1602 is "01", and the down-convert constraint mode condition 1604 is "0", it is indicated that the recording is inhibited, and it is possible to output the sound by encrypting the content, and to perform the down-convert at this time, as the sound output operation.

Next, a process at the time of transmitting the content from the content transmission device to the content reception device will be described by using FIG. 12 to FIG. 16.

Figure 12:
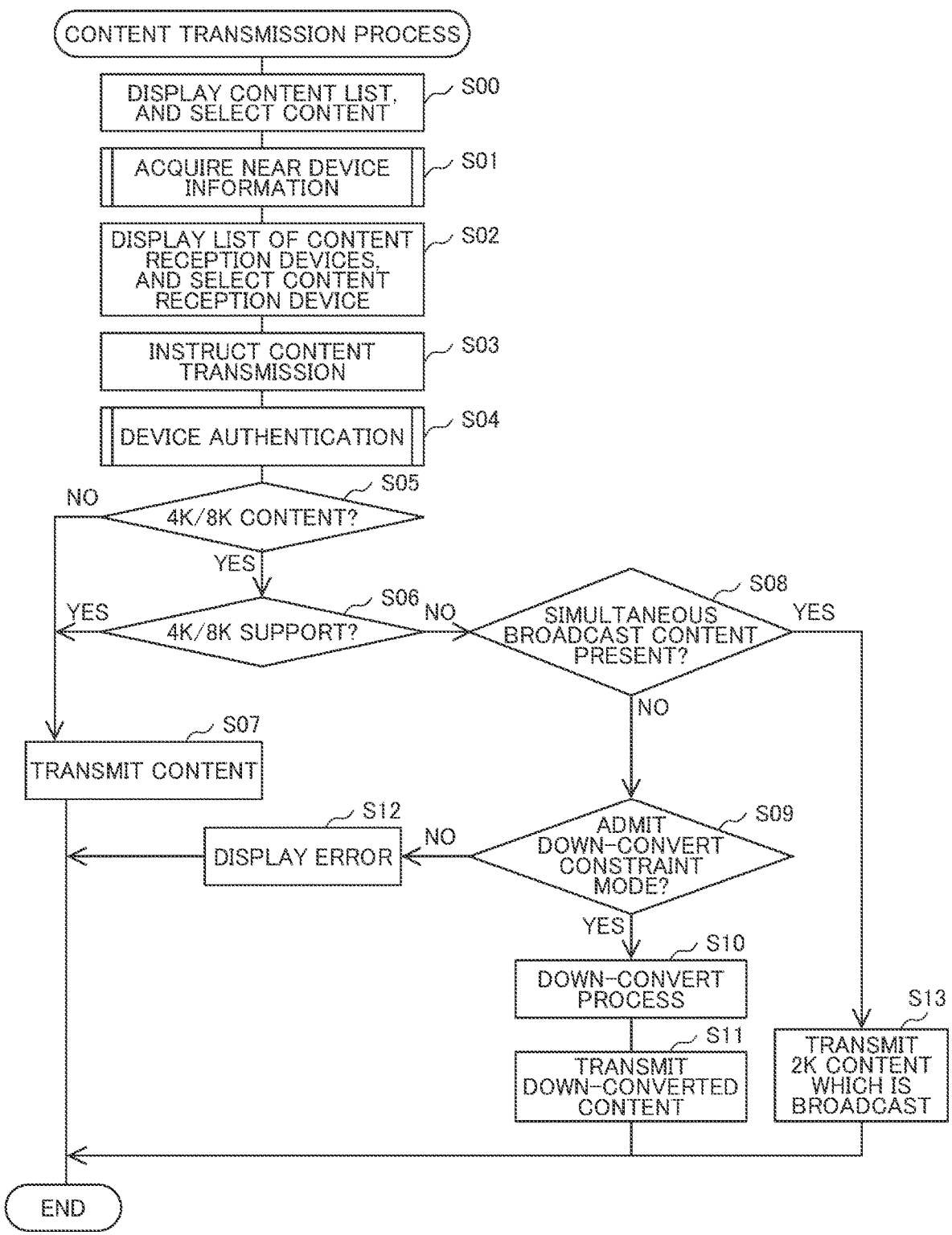
FIG. 12 is a general flowchart when the content is transmitted to the content reception device from the content transmission device.

FIG. 12 is a flowchart at the time of transmitting the content from the content transmission device to the content reception device.

Figure 13:
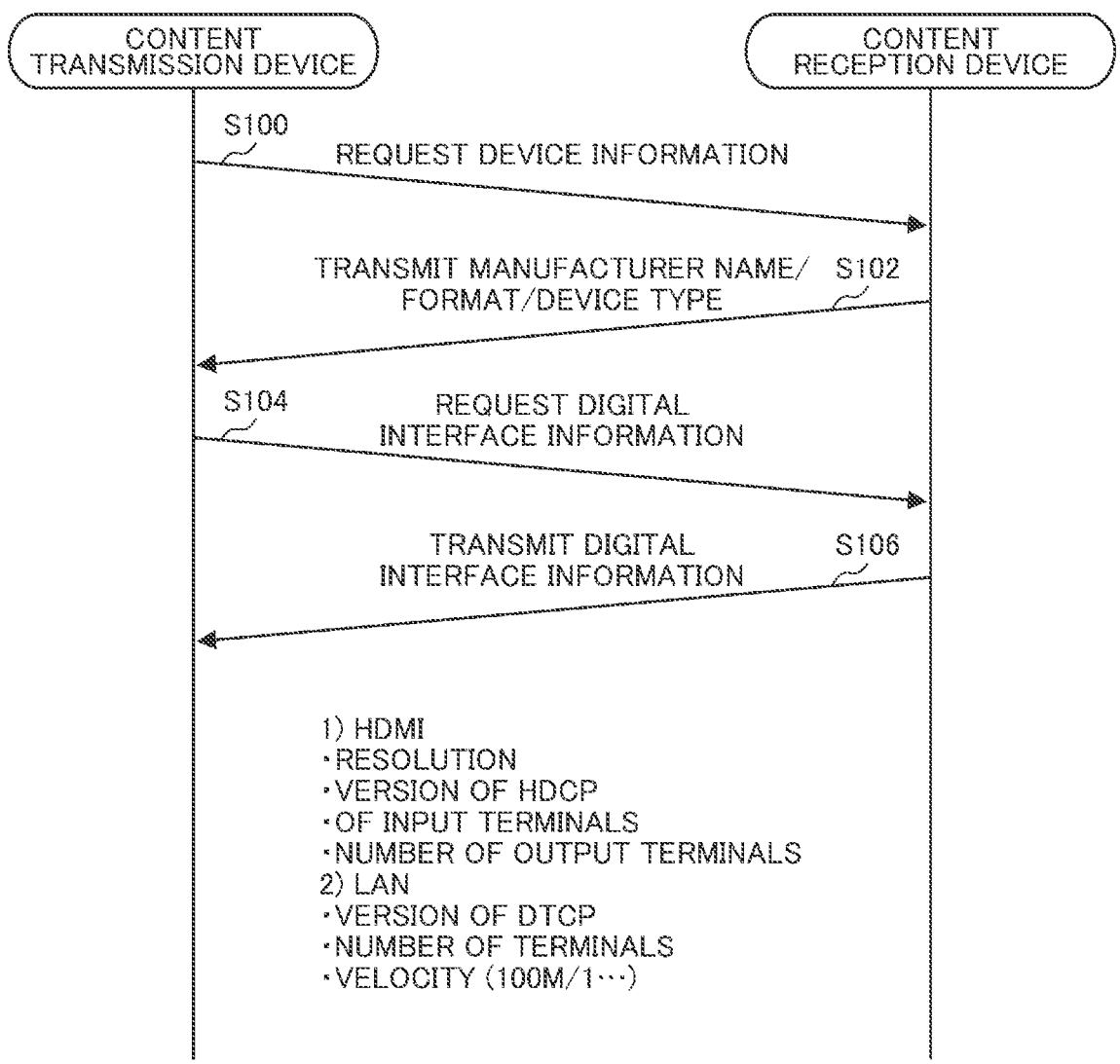
FIG. 13 is a sequence diagram of a device information acquisition process.

FIG. 13 is a sequence diagram of the device information acquisition process.

Figure 14:
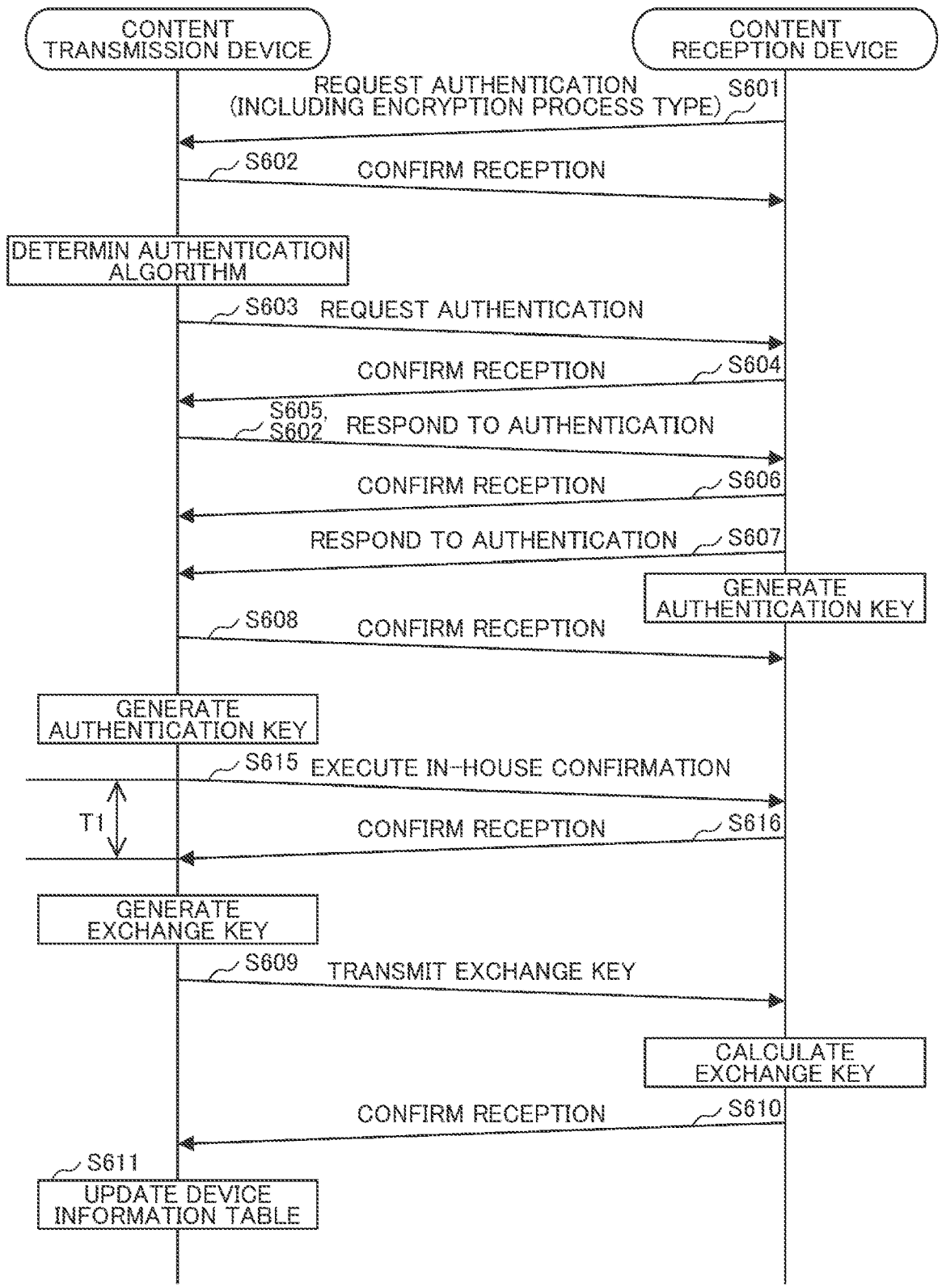
FIG. 14 is a sequence diagram of a device authentication process.

FIG. 14 is a sequence diagram of the device authentication process.

Figure 15:
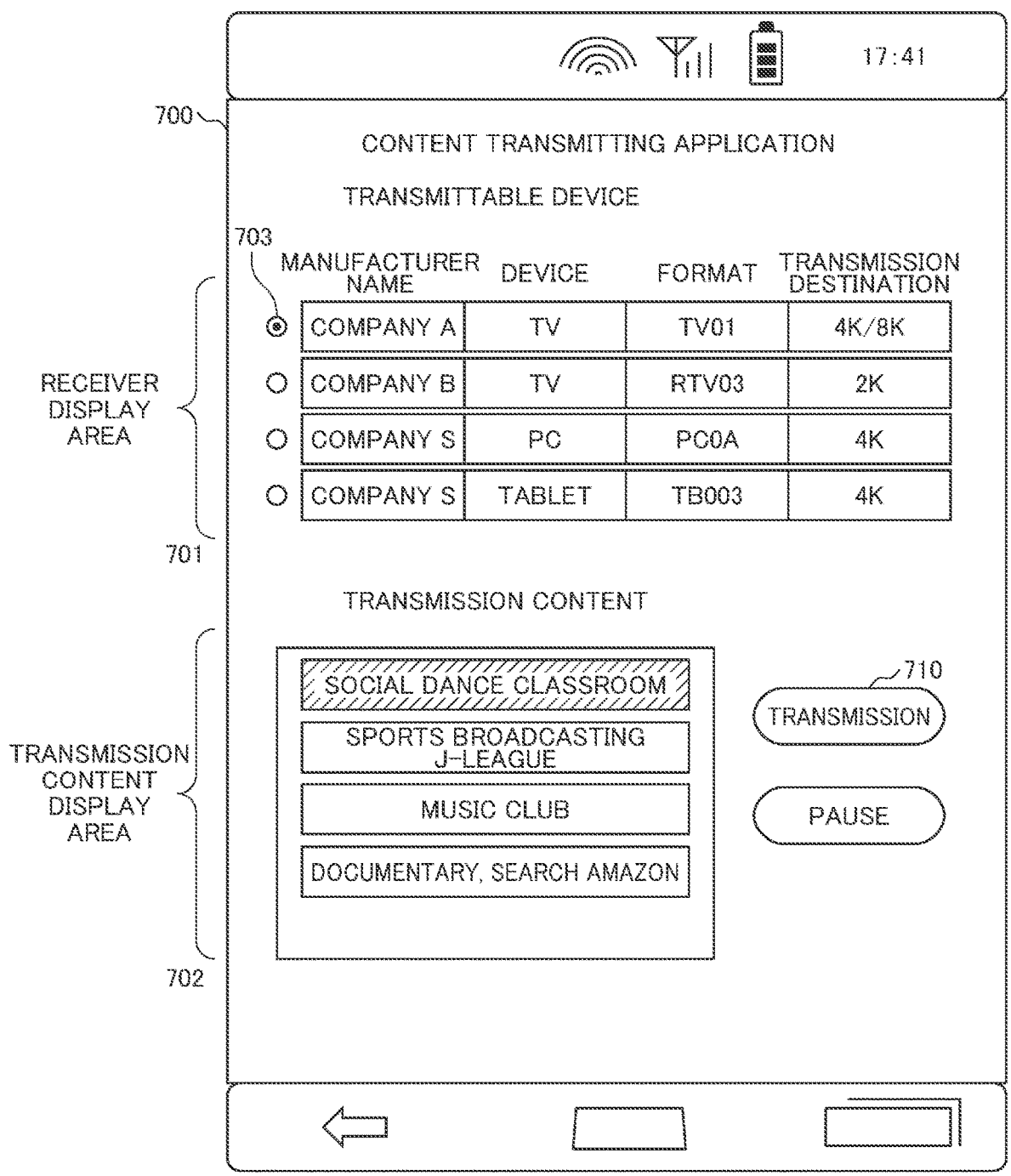
FIG. 15 is a diagram illustrating an example of a user interface displaying device information.

FIG. 15 is a diagram illustrating an example of a user interface displaying the device information.

Figure 16:
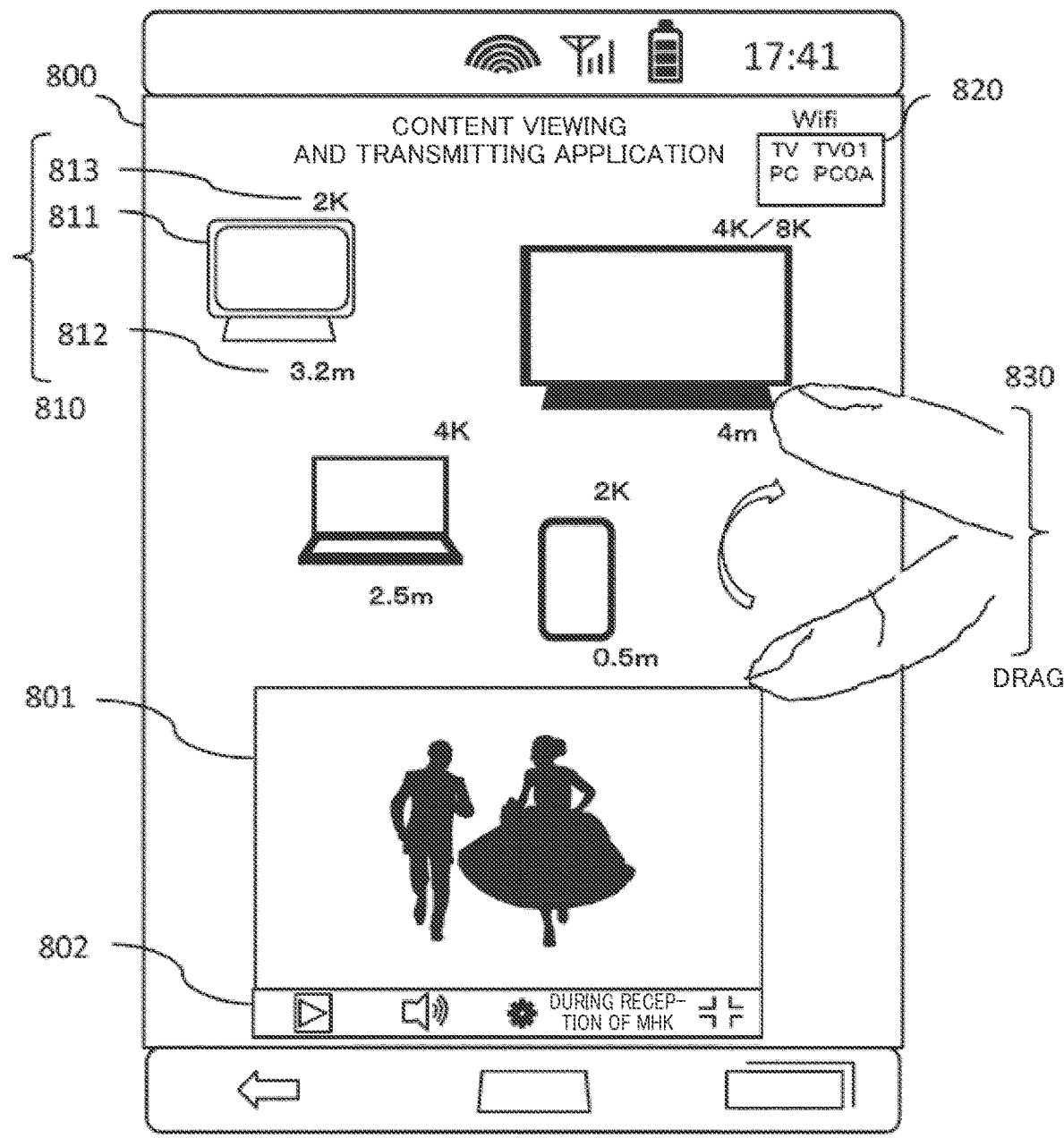
FIG. 16 is a diagram illustrating an example of the user interface of a content viewing and transmitting application.

FIG. 16 is a diagram illustrating an example of the user interface of a content viewing and transmitting application.

The content transmission device, as necessary, performs application activation or function selection for viewing a content, and thus, acquires information relevant to a content that the own device is capable of viewing or outputting, and displays a content list screen on a built-in or external monitor. For example, in the case of the smart phone 100, there are a content being received or to be received by the content tuner 112, a content being received or to be received by the wireless LAN 106, and a content recorded in the main memory 104 or the flash memory 230. The user selects a content desired to be viewed from the displayed list screen of the content, by using touch panel 124 or the input unit 270/370 (S00).

Next, the monitor for viewing the content selected in S00 by using the monitor identification program 152 is selected. First, information relevant to the near content reception device is acquired by one or more communication means such as a wired LAN (Ethernet), a wireless LAN (Wifi), short-distance communication (Bluetooth), and the distance image sensor 144 (S01). In a device information acquisition process S01, for example, a mechanism of universal plug and play (UPnP) or digital living network alliance (DLNA) is used. The device information acquisition process S01 will be described later in detail by using FIG. 13.

Next, the content transmission device displays the acquired device information on the built-in or external monitor screen (S02). An example of displaying the device information will be described later in detail by using the case of the smart phone 100 as an example.

The user designates the content reception device by using a touch panel or an input unit (S02), and instructs the transmission of the content (S03). At this time, the content transmission device, as necessary, instructs the reception of the content with respect to the content reception device which is designated by using a protocol such as the DLNA.

Next, a predetermined device authentication process is performed between the content transmission device and the content reception device by using a device authentication program (S04). The device authentication process S04 will be described later in detail by using FIG. 14.

Next, the content transmission device determines whether or not the content is the 4K/8K content, with reference to the format of the content selected in S00 (S05). Here, information relevant to the format of the content, for example, is included in a code control descriptor (video_decode_control_descriptor) in a video in a program map table (PMT) of an MPEG system.

When the content is not the 4K/8K content (S05: NO), it is determined whether or not the content can be output with reference to the output control rules by the digital copy control descriptor and content availability descriptor 1500 of the content. Then, only in a case where the content can be output, the content is transmitted to the content reception device. Here, a process in a case where encryption is necessary at the time of outputting the content by using the encryption/decryption program, will be described. In a case where the device authentication process executed in S404 is an authentication algorithm for a 2K content, encryption is performed on the basis of the key information shared with the content reception device by using an encryption process I 407b, and transmission is performed in the format described in FIGS. 7A(a) and 7A(b). On the other hand, in a case where the device authentication process is an authentication algorithm for a 4K/8K content, encryption is performed on the basis of the key information shared with the content reception device by using an encryption process II 407a, and transmission is performed in the format described in FIGS. 7B(a) and 7B(b)(S07).

When the content is the 4K/8K content (S05: YES), the content reception device which is a transmission target of the content, determines whether or not the 4K/8K content is supported, with reference to information acquired in S01. In addition, the content transmission device determines whether the authentication algorithm used in the device authentication process of S04 is used for the 2K content or for the 4K/8K content (S06). For example, even in a case where 4K/8K is supported in the information acquired in S01, it is determined that the 4K/8K content is not supported in a case where the authentication algorithm for a 2K content is used in S04. In addition, even though it is not illustrated, a sequence of reporting a resolution supported from the content reception device to the content transmission device may be provided at the time of the device authentication process.

When the 4K/8K content is supported (S05: YES), it is determined whether or not the content can be output, with reference to the output control rules by the digital copy control descriptor and content availability descriptor 1500 of the content. Then, only in a case where the content can be output, the content is transmitted to the content reception device. Here, in a case where encryption is necessary at the time of outputting the content by using the encryption/decryption program, encryption is performed on the basis of the key information shared with the content reception device by using the encryption process II 407a, and transmission is performed in the format described in FIGS. 7B(a) and 7B(b)(S07).

When the 4K/8K content is not supported (S05: NO), it is determined whether or not there is a broadcasting program performing simultaneous broadcast of 2K (S08). This can be confirmed by the simul broadcasting program information 1403 of the down-convert constraint descriptor 1400 of FIG. 9C.

When there is a broadcasting program performing the simultaneous broadcast (S08: YES), it is determined whether or not the content can be output, with reference to the output control rules by the digital copy control descriptor and content availability descriptor 1500 of the content of the broadcasting program. Then, only in a case where the content can be output, the content is transmitted to the content reception device. Here, in a case where encryption is necessary at the time of outputting the content, encryption is performed on the basis of the key information shared with the content reception device by using the encryption process I 407b, and transmission is performed in the format described in FIGS. 7A(a) and 7A(b)(S13).

When there is no broadcasting program performing the simultaneous broadcast (S08: YES), it is determined whether or not the down-convert constraint mode 1207 of the content availability descriptor 1200 of FIG. 9A is in the admission of the down-convert (S09).

When the down-convert is not admitted (S09: NO), the content transmission device displays an error to the effect that the content is not capable of being transmitted to the built-in or external monitor screen (S12).

When the down-convert is admitted (S09: YES), the content transmission device performs a down-convert process of changing the resolution of the content, the screen service, the brightness range, or the like by using the down-convert program and the down-convert unit 404 (S10), and transmits a content which is obtained by recompressing the down-converted content by the encoding unit 408, to the content reception device. Here, in a case where encryption is necessary at the time of outputting the content, encryption is performed on the basis of the key information shared with the content reception device by using the encryption/decryption program and the encryption process I 407b, and transmission is performed in the format described in FIGS. 7A(a) and 7A(b)(S11).

Here, the content transmission instruct S03 and the device authentication process S04 may be performed after S05 of determining whether or not the content is the 4K/8K content.

Next, the device information acquisition process will be described by using FIG. 13. Furthermore, this process is executed by using the CPU 102 and the device information management program 160 of the content transmission device, and the CPU 202 and the device information management program 240 of the content reception device.

The content transmission device requests the device information with respect to the content reception device (S100). At this time, the content transmission device may use a plurality of interfaces provided by itself and various protocols together. For example, monitor detection may be performed by using a distance image or a color image acquired by a distance image sensor or a camera while acquiring the device information by using a mechanism of the DLNA through a wireless/wired LAN and a short-distance wireless unit (Bluetooth).

The content reception device receives the device information request, and transmits information such as a manufacturer name/format/device type (S102). In addition, a uniform resource locater (URL) provided by a manufacturer may be included.

Next, the content transmission device requests digital interface information with respect to the content reception device (S104).

The content reception device receives the digital interface information request, and transmits the digital interface information (S106). The digital interface information, for example, resolution, the presence or absence of HDR support, is the version of the HDCP, the number of the input terminal, the number of the output terminal, and the like, at the time of the HDMI, and is the version of the encryption process, the number of the terminal, the wireless standard, the velocity, and the like, at the time of the LAN.

Here, the information request of S100 and S104 may be combined into one request. In addition, there is a method in which the information of manufacturer name/model/URL is acquired in S100, and then, an access with respect to Web information provided by each manufacturer is performed by using a wired/wireless instead of issuing S104, and the detailed information is acquired.

Next, the device authentication process will be described by using FIG. 14. Furthermore, this process is executed by using the authentication unit 406 and the device authentication program 158 of the content transmission device, and the authentication unit 426 and the device authentication program 238 of the content reception device.

In this example, first, the content reception device requests authentication with respect to the content transmission device (S601). In the authentication request process, the content reception device transmits the device specific information including the device ID, the version of the encryption process (the standard of whether it is the encryption process I or the encryption process II), and a certificate with respect to the device specific information to the content transmission device, in addition to the authentication request. A service type (a service level, a charge/no charge, or the like set in advance) or a content type (a resolution level such as SD/HD/Full HD/UHD, a genre such as news/sport/motion picture, and the like) may be included, or a setting value defined by a predetermined protocol may be included, instead of the version of the encryption process.

The content transmission device receives the authentication request, or transmits reception confirmation thereof to the content reception device (S602). At this time, it is confirmed whether or not the value of the number 5221 of authentication devices in the device control information table 5200 is less than the authentication device maximum number 5101 in the device information definition table 5100, and in a case where the value is less than the authentication device maximum number 5101, the subsequent process is continued, and in a case where the value reaches the authentication device maximum number 5101, the reception confirmation of the error is transmitted, and then, the process is ended.

Next, it is confirmed whether the encryption process designated by the content reception device is the encryption process I or the encryption process II, an authentication algorithm to be used is determined, and then, an authentication request from the own side is prepared, and specific information of the content transmission device and a certificate thereof are is additionally transmitted to the content reception device, as with the case of the authentication request of S601 (S603).

The content reception device receives the authentication request, or transmits the reception confirmation to the content transmission device (S604).

Next, the content transmission device verifies each information item of the authentication request which is received according to the procedure of the encryption process I or the encryption process II, and additionally transmits an authentication response with a parameter necessary for generating key information which is different between the encryption process I and the encryption process II to the content reception device (S605).

The content reception device receives the authentication response, or transmits the reception confirmation to the content transmission device (S606), and then, prepares the authentication response from the own side, transmits the authentication response with the parameter necessary for generating the key information, to the content transmission device, as with the case of the content transmission device (S607), and generates an authentication key common to the content transmission device by using a necessary parameter.

Next, the content transmission device receives the authentication response, or transmits the reception confirmation to the content reception device (S608), and as with the content reception device, generates an authentication key common to the content reception device by using a necessary parameter.

After that, the content transmission device activates a timer, and then, transmits an in-house confirmation execution request with respect to the content reception device, in order to confirm whether the content reception device is a device in the house (S615). On the contrary, the content reception device transmits the reception confirmation to the content transmission device (S616). In a case where the reception confirmation is received, the content transmission device stops the timer, and confirms that a measured value (T1) is not greater than a predetermined value (T) until the reception confirmation is received after the in-house confirmation execution request is issued. In the case of Measured Value (T1)≤Predetermined Value (T), it is determined that the content reception device is in the house, and is a device within a range of a personal use. On the other hand, in the case of Measured Value (T1)>Predetermined Value (T), it is determined that there is a possibility that the content reception device is outside the house, the subsequent process is paused, and the device authentication process is ended. According to such a procedure, the common authentication key is generated and is shared in the authentication unit 406 of the content transmission device and the authentication unit 426 of the content reception device.

Next, the content transmission device generates the exchange key which is used at the time of encrypting the content, encrypts the exchange key by using the generated authentication key, and transmits the encrypted exchange key to the content reception device along with an ID for identifying the exchange key (S609). Here, exchange keys having different key lengths or calculation methods are generated the encryption process I and the encryption process II.

Then, the content reception device decrypts the exchange key which is transmitted from the content transmission device by using the authentication key generated in advance, and transmits the reception confirmation (S610).

Next, in a case where the reception confirmation is received, the content transmission device registers information relevant to the content reception device in the device information table 5300 illustrated in FIG. 8C (S621).

According to the process procedure illustrated in FIG. 14 described above, the content transmission device and the content reception device are capable of sharing the common exchange key with each other. The exchange key is set in the exchange key 5220 of the device control information table 5200 of FIG. 8B along with additional information relevant to the exchange key, and is used for generating a common key for encrypting/decrypting the content.

Here, only in a case where it is successful in the device authentication process described above, the content transmission device admits the subsequent content encryption and output. At this time, it is confirmed whether or not the value of the number 5222 of simultaneous accesses or the number 5223 of simultaneous accesses (4K/8K) is less than the simultaneous access maximum number 5103 or the simultaneous access maximum number (4K/8K) 5104 in the device information definition table 5100, with reference to the number 5222 of simultaneous accesses in the device control information table 5200 with respect to a content which is required to be encrypted in the encryption process I, and the number 5223 of simultaneous accesses (4K/8K) with respect to a content which is required to be encrypted in the encryption process II, and only in a case where it is possible to confirm that the value is less than the simultaneous access maximum number 5103 or the simultaneous access maximum number (4K/8K) 5104, output is performed.

In addition, the content transmission device may perform the determination of the authentication algorithm which is performed in S603, after the authentication request of S601 is received.

In addition, in a case where a content to which the transmission request is performed, is the 4K/8K content, and the down-convert is inhibited, the subsequent process may be ended when the encryption process designated by the content reception device in S603 described above is the encryption process I.

Next, the user interface when the smart phone 100 is the content transmission device, will be described by using FIG. 15 and FIG. 16.

In FIG. 15, an example is illustrated in which the smart phone 100 displays the device information and the title of the content, which is a target to be transmitted, in a content transmitting application (hereinafter, application software of the smart phone 100 will be simply referred to as an "application"), as an example of content device information display illustrated in S02 of FIG. 12.

The user confirms the device information displayed in a receiver display area 701 (content support of manufacturer/device type/format/transmission destination), and taps the receiver display area 701 with the finger of the user, and thus, a radio button 703 can be marked, and the transmission destination of the content can be selected.

In addition, the title of the content displayed in a transmission content display area 702 is confirmed, and is tapped by the finger, and thus, can be selected. Accordingly, the selected title of the content is brightly displayed.

Then, the user taps a transmission button 710 when the selected title of the content is transmitted to the selected content reception device.

In addition, as illustrated in FIG. 16, a user interface which is capable of viewing the content, and is easy to be visually and intuitively manipulated, is considered as a user interface at the time of the other content transmission.

The smart phone 100 reproduces the content in a viewing area 801. As illustrated in the drawing, a control bar 802 can be added to the viewing area 801.

In addition, the near digital device of the smart phone 100 is displayed in a reception device display area 810, as a digital device icon 811. A distance 812 and a content support information 813 are displayed in the device icon 811, as the associated information.

The acquisition of the device information is performed by the communication means such as a wired LAN (Ethernet), a wireless LAN (Wifi), and short-distance communication (Bluetooth), according to the device information acquisition process illustrated in FIG. 13. In addition, the smart phone 100 obtains the distance of the near digital device by the distance image sensor 144 illustrated in FIG. 2, acquires an image, performs image recognition with respect to the shape of device, a model number display character of the device, or the like, and matches the image with template information of the device (not illustrated) prepared in advance, and thus, obtains a manufacturer name or a format, and matches the manufacturer name or the format with the manufacturer name or the format acquired by the device information acquisition process, and therefore, correspondence between the digital device icon 811 and the actual content reception device can be performed.

In addition, the distance may be assumed according to the degree of radio field intensity of the wireless LAN (Wifi), the short-distance communication (Bluetooth), or the like, and the digital device icon 811 and the content reception device of the device information acquisition process may be associated with each other.

Further, in order to confirm a device which is capable of receiving a radio wave of Wifi, and to perform communication, but is not in the vicinity of the content transmission device, a device type and a model number are displayed in a Wifi area 820.

When the user transmits the content to the content reception device which is displayed in the digital device icon 811, the viewing area 801 may be directly dragged to the device icon 811 (830).

As described above, the content providing source is capable of providing a high-quality content to the user while easily ensuring the copyright, and is capable of allowing the user to safely view a suitable content by a suitable monitor, without exceeding the range of the personal use of the content.

REFERENCE SIGNS LIST

5: broadcasting station
6: content providing server
7: base station
11: hub
12: router
20: wireless access point
50: tablet
60: Internet
GPS satellite
80: wired network
100: smart phone
200: recorder built-in television receiver
300: television receiver
400: laptop computer

The invention claimed is:

1. A content transmission device transmitting a content to a content reception device, the device comprising:
a first encryption process means encrypting the content by a first encryption process;
a second encryption process means encrypting the content by a second encryption process which is different from the first encryption process; and
a convert means converting the content,
wherein information relevant to the encryption process of the content reception device is received from the content reception device,
in a case where the content reception device supports the second encryption process, the content is encrypted by the second encryption process means to be transmitted, and
in a case where the content reception device does not support the second encryption process, the content is converted to be suitable for the first encryption process, and the converted content is encrypted by the first encryption process to be transmitted.

2. The content transmission device according to claim 1, wherein the first encryption process is a process of encrypting a low-resolution content with respect to a content which is intended by the second encryption process, and
the convert is a process of down-converting a content.

3. The content transmission device according to claim 1, further comprising:
a reception means receiving information of a device from the content reception device;
a display means displaying the received information of the device; and
a transmission means transmitting a content to a content reception device which is selected from content reception devices corresponding to the displayed information.

4. The content transmission device according to claim 1, wherein information relevant to simultaneous broadcast of a content is retained,
when the content reception device does not support the second encryption process, it is determined whether or not there is simultaneous broadcast of the corresponding content in a form suitable for the first encryption process, with reference to the information relevant to the simultaneous broadcast of the content, and
when there is the simultaneous broadcast of the corresponding content in the form suitable for the first encryption process, the simultaneous broadcast of the content is received, and the content is encrypted by the first encryption process to be transmitted.

5. The content transmission device according to claim 3, further comprising:
a distance image sensor obtaining a distance by acquiring an image of a target;
a monitor identification means obtaining a manufacturer name, a model, and a device type of the content reception device from the image; and
a display means displaying the content reception device which is identified by the monitor identification means, as an icon,
wherein the display means displays the icon of the content reception device, along with the distance which is acquired by the distance image sensor, and
the information of the device which is received by the reception means receiving the information of the device, and the icon of the content reception device are displayed in association with each other, and the content is transmitted to a content reception device which is selected from content reception devices associated with the icon of the content reception device.

6. A content transmission method of transmitting a content to a content reception device from a content transmission device,
the content transmission device including,
a first encryption process means encrypting the content by a first encryption process,
a second encryption process means encrypting the content by a second encryption process which is different from the first encryption process, and
a convert means converting the content,
the method comprising:
a step of allowing the content transmission device to receive information relevant to the encryption process of the content reception device from the content reception device;
a step of allowing the content transmission device to encrypt the content by the second encryption process means to be transmitted, in a case where the content reception device supports the second encryption process;
a step of allowing the content transmission device to convert the content to be suitable for the first encryption process, in a case where the content reception device does not support the second encryption process; and
a step of allowing the content transmission device to encrypt the converted content by the first encryption process to be transmitted.

7. The content transmission method according to claim 6, wherein the first encryption process is a process of encrypting a low-resolution content with respect to a content which is intended by the second encryption process, and
the convert is a process of down-converting a content.

8. The content transmission method according to claim 6, further comprising:

a step of allowing the content transmission device to receive information of a device from the content reception device;

a step of displaying the received information of the device; and a step of transmitting the content to a content reception device which is selected from content reception devices corresponding to the displayed information.

9. The content transmission method according to claim 6, wherein the content transmission device retains information relevant to simultaneous broadcast of a content, and the method further comprises:

a step of allowing the content transmission device to determine whether or not there is simultaneous broadcast of the corresponding content in a form suitable for the first encryption process, with reference to the information relevant to the simultaneous broadcast of the content, when the content reception device does not support the second encryption process;

a step of allowing the content transmission device to receive the simultaneous broadcast of the content, when there is the simultaneous broadcast of the corresponding content in the form suitable for the first encryption process; and a step of allowing the content transmission device to encrypt the received content by the first encryption process to be transmitted.

10. The content transmission method according to claim 8, wherein the content transmission device includes, a distance image sensor obtaining a distance by acquiring an image of a target, a monitor identification means obtaining a manufacturer name, a model, and a device type of the content reception device from the image, a display means displaying the content reception device which is identified by the monitor identification means, as an icon, the method further comprises:

a step of allowing the display means to display the icon of the content reception device, along with the distance which is acquired by the distance image sensor;

a step of allowing the display means to display the received information of the device and the icon of the content reception device in association with each other; and a step of allowing the content transmission device to transmit the content to a content reception device which is selected from content reception devices associated with the icon of the content reception device.

* * * * *